US011711744B2

(12) United States Patent
Kim et al.

(10) Patent No.: US 11,711,744 B2
(45) Date of Patent: Jul. 25, 2023

(54) METHOD AND APPARATUS FOR INTERACTION BETWEEN AN EDGE COMPUTING SYSTEM AND A MOBILE COMMUNICATION NETWORK FOR PROVIDING EDGE COMPUTING SERVICE

(71) Applicant: Samsung Electronics Co., Ltd., Suwon-si (KR)

(72) Inventors: Hyesung Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 17/601,571

(22) PCT Filed: Jun. 29, 2021

(86) PCT No.: PCT/KR2021/008189
§ 371 (c)(1),
(2) Date: Oct. 5, 2021

(87) PCT Pub. No.: WO2022/005170
PCT Pub. Date: Jan. 6, 2022

(65) Prior Publication Data
US 2022/0330128 A1  Oct. 13, 2022

(30) Foreign Application Priority Data
Jun. 30, 2020  (KR) .......................... 10-2020-0080516

(51) Int. Cl.
*H04W 4/50* (2018.01)
*H04W 8/18* (2009.01)
(Continued)

(52) U.S. Cl.
CPC ........... *H04W 40/248* (2013.01); *H04W 4/50* (2018.02); *H04W 8/18* (2013.01); *H04W 24/02* (2013.01);
(Continued)

(58) Field of Classification Search
CPC ....... H04W 4/50–60; H04W 8/005–30; H04W 24/02–10; H04W 28/02–26;
(Continued)

(56) References Cited

U.S. PATENT DOCUMENTS

2017/0060574 A1  3/2017  Malladi et al.
2019/0191341 A1  6/2019  Trang et al.
(Continued)

FOREIGN PATENT DOCUMENTS

| KR | 10-2018-0067502 A | 6/2018 |
| KR | 10-2019-0058763 A | 5/2019 |
| KR | 10-2021-0087881 A | 7/2021 |

OTHER PUBLICATIONS

Huawei et al., "Clarification about Network Capability Exposure", 3GPP TS 23.558 v0.3.0, 3GPP TSG-SA WG6 Meeting #38-e e-meeting, Jul. 20-31, 2020, S6-20xxxx.

*Primary Examiner* — Timothy J Weidner
(74) *Attorney, Agent, or Firm* — Jefferson IP Law, LLP

(57) ABSTRACT

The disclosure relates to a 5G or pre-5G communication system for supporting a higher data rate after a 4G communication system such as LTE. A method according to an embodiment of the disclosure is a control method in an edge enabler server (EES) of a mobile edge computing system, and may include subscribing to a user plane path change event at an edge application server (EAS); determining an application context relocation (ACR) based on receiving a user plane path management event notification from the mobile communication network in case of subscribing to the
(Continued)

user plane path change event for the EAS; transmitting an ACR request message to the EAS; receiving an EAS response message from the EAS; and transmitting an application function (AF) acknowledgment message to a first node of the mobile communication network in response to receiving the EAS response message from the EAS.

24 Claims, 10 Drawing Sheets

(51) Int. Cl.
| | |
|---|---|
| *H04W 24/02* | (2009.01) |
| *H04W 28/02* | (2009.01) |
| *H04W 28/12* | (2009.01) |
| *H04W 40/02* | (2009.01) |
| *H04W 40/24* | (2009.01) |
| *H04W 64/00* | (2009.01) |
| *H04W 80/10* | (2009.01) |
| *H04W 80/12* | (2009.01) |
| *H04W 84/00* | (2009.01) |
| *H04W 84/02* | (2009.01) |
| *H04W 88/00* | (2009.01) |
| *H04W 88/18* | (2009.01) |
| *H04W 92/02* | (2009.01) |
| *H04W 92/24* | (2009.01) |

(52) U.S. Cl.
CPC ....... *H04W 28/0226* (2013.01); *H04W 28/12* (2013.01); *H04W 40/02* (2013.01); *H04W 64/003* (2013.01); *H04W 80/10* (2013.01); *H04W 80/12* (2013.01); *H04W 84/005* (2013.01); *H04W 84/02* (2013.01); *H04W 88/005* (2013.01); *H04W 88/18* (2013.01); *H04W 92/02* (2013.01); *H04W 92/24* (2013.01)

(58) Field of Classification Search
CPC ......... H04W 36/0005–385; H04W 40/005–38; H04W 48/02–20; H04W 60/005–06; H04W 64/003–006; H04W 76/10–50; H04W 80/02–12; H04W 84/005–22; H04W 88/005–188; H04W 92/02–24
See application file for complete search history.

(56) References Cited

U.S. PATENT DOCUMENTS

2020/0154459 A1  5/2020  Mukherjee et al.
2020/0195495 A1  6/2020  Parker et al.

METHOD AND APPARATUS FOR INTERACTION BETWEEN AN EDGE COMPUTING SYSTEM AND A MOBILE COMMUNICATION NETWORK FOR PROVIDING EDGE COMPUTING SERVICE

TECHNICAL FIELD

The disclosure relates to a method and apparatus for providing an edge computing service to a user equipment in a mobile communication network and, more particularly, to a method and apparatus for interactions between an edge computing system and a mobile communication network for providing an edge computing service.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on an advanced small cell, a cloud radio access network (cloud RAN), an ultra-dense network, device-to-device (D2D) communication, a wireless backhaul, a moving network, cooperative communication, coordinated multi-points (CoMP), reception-end interference cancellation, and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The disclosure relates to a communication system, and a terminal may establish a data connection with an edge data network that is located close to the terminal's location in order to use a low-latency or broadband service. In an edge computing system, the terminal may be provided with a data service by accessing an application server running in an edge hosting environment or an edge computing platform that operates in an edge enabler server of the corresponding edge data network. In this case, the terminal that wants to access the edge computing system may be a mobile communication terminal that is provided with a mobile communication service.

In order for the mobile communication terminal to access a mobile edge computing (MEC) system, a procedure for interactions between the mobile communication network and the MEC system should be defined.

However, until now, a specific procedure for interactions between the MEC system and the mobile communication system to provide the MEC service to the mobile communication terminal has not been defined.

DISCLOSURE OF INVENTION

Technical Problem

As mentioned above, the procedure for interactions between the MEC system and the mobile communication network is not defined. Therefore, there may occur a situation in which an edge application server and an edge enabler server existing in the MEC system redundantly interact with the mobile communication system, for example, the 3GPP network to perform the same operation. In this case, resource inefficiency may be caused due to redundant use of resources to perform the same operation.

Accordingly, in order to solve this problem, the disclosure provides a method and apparatuses for providing a procedure for interactions between the MEC system and the mobile communication system.

In addition, the disclosure provides a method in which the edge enabler server interacts with the 3GPP network on behalf of the edge application server registered therein.

The disclosure proposes a procedure for acquiring information of the edge application server required for interactions with the 3GPP network in order to support such indirect interactions.

Also, the disclosure provides a method for the edge data network to process information in a form that can be used in the 3GPP network.

Further, the disclosure provides a procedure for the edge data network to continuously provide an edge computing service by utilizing information acquired as a result of interactions with the 3GPP network.

Solution to Problem

According to an embodiment of the disclosure, a method for an edge enabler server of an edge computing data network to provide an edge computing service to a user equipment of a mobile communication system may include receiving, at the edge enabler server, a registration request message from an application server that provides an edge computing service to the user equipment, wherein the registration request message includes at least one of EAS service continuity capability/support, AF request support, traffic routing requirement information, EAS data network access identifier (DNAI) information, and AF transaction identifier (ID); transmitting an application function (AF) request message indicating at least one of the information to the mobile communication network based on the information included in the registration request message; searching for a target application server for a user plane management when receiving a message corresponding to a user plane management event of the user equipment from the mobile communication network; and providing the search result to the mobile communication network and the user equipment.

Advantageous Effects of Invention

According to the disclosure, the edge enabler server performs interactions with the 3GPP network instead of individual edge application servers, so it is possible to reduce a redundant use of network resources. Also, it is possible to support interactions between the 3GPP network and the edge application server without an individual service agreement between a mobile communication network operator and a third-party edge application server provider that is not an edge computing service provider (e.g., an edge enabler server provider) nor the mobile communication network operator.

MODE FOR THE INVENTION

Hereinafter, the operation principle of the disclosure will be described in detail with reference to the accompanying drawings. Furthermore, terms to be described hereunder have been defined in consideration of functions in the disclosure. Such terms may vary depending on a user's or operator's intention or custom, so their definitions should be determined based on the contents of this specification.

In the disclosure, terms referring to network entities and entities of an edge computing system, terms referring to messages, terms referring to identification information, etc. are exemplified for convenience of description. Accordingly, the disclosure is not limited to the terms described later, and other terms referring to objects having equivalent technical meanings may be used.

In the disclosure, terms and names defined in the 3GPP system standard are used for convenience. However, the disclosure is not limited by such terms and names, and may be equally applied to systems complying with other standards.

The disclosure to be described hereinafter provides a method and apparatus for an edge application server of an MEC system to interwork with a mobile communication network, for example, a 3GPP network.

In addition, the disclosure provides a method for an edge enabler server, which serves as an application function (AF) on behalf of the edge application server of the MEC system, to define and transfer information required for AF request execution request and AF request creation.

In addition, the disclosure provides a method for the edge enabler server of the MEC system to perform AF request by transforming, or responding to, information provided by the edge application server into the form of information that a 3GPP network function device can understand.

In addition, the disclosure provides a method for the edge enabler server to perform, based on information provided from the 3GPP network as a result of the AF request, operations required for providing an edge computing service (e.g., selecting a new edge application server in response to a terminal movement, determining whether the edge computing service is continuously available, or the like).

Figure 1:
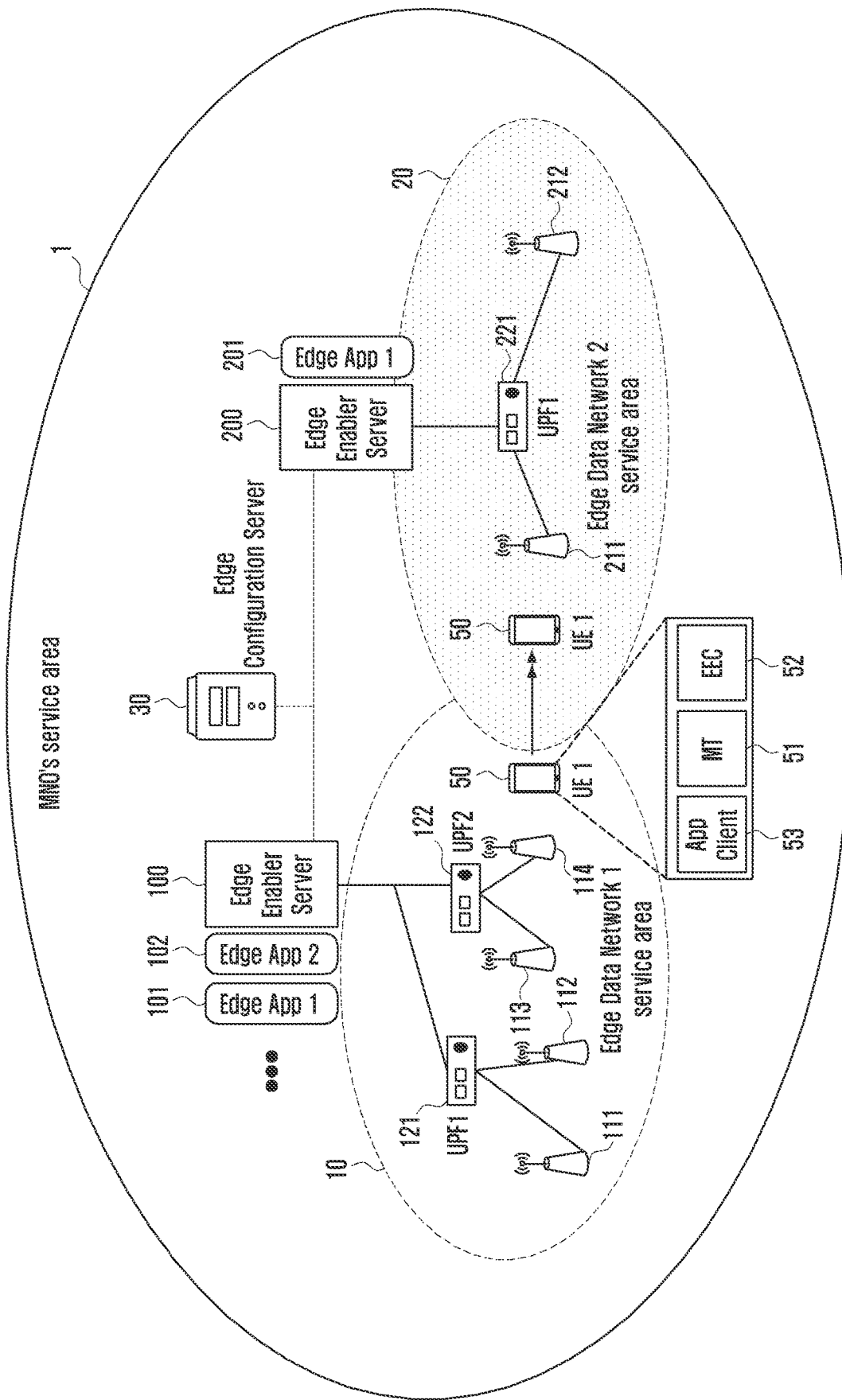
FIG. 1 is a diagram illustrating a connection between a 3GPP network and an edge computing system network and a movement of a terminal according to the disclosure.

FIG. 1 is a diagram illustrating a connection between a 3GPP network and an edge computing system network and a movement of a terminal according to the disclosure.

Referring to FIG. 1, a service area 1 of a mobile network operator (MNO) is illustrated. The service area 1 of the MNO may contain divided edge data networks to provide an edge computing service to an electronic device. Each of the edge data networks may have a region 10 or 20 for providing the edge computing service to the electronic device (UE1) 50. For example, in FIG. 1, the service region 10 of the first edge data network contains a first base station 111, a second base station 112, a third base station 113, and a fourth base station 114, and the service region 20 of the second edge data network contains a fifth base station 211 and a sixth base station 212.

In the example of FIG. 1, the service area 10 of the first edge data network including the first base station 111 to the fourth base station 1114 further contains two different user plane function (UPF) devices 121 and 122. In the following description, the UPFs 121 and 122 may be logically understood as one network device unless otherwise specified. Therefore, in the following description, the UPFs 121 and 122 will be referred to as 'UPF device' or 'UPF'. In addition, the service region 20 of the second edge data network contains only one UPF1 221, for example. As can be seen from the example of FIG. 1, one edge data network may have one or more UPFs.

The service region 10 of the first edge data network may be an area managed by one edge enabler server 100. Also, the service region 20 of the second edge data network may be an area managed by another edge enabler server 200. As such, the service regions 10 and 20 of the edge data network may be configured as areas that can be managed by the edge enabler servers 100 and 200. In another example, the edge data network service regions 10 and 20 may be defined as areas of edge application servers connected to the edge enabler servers 100 and 200. Also, as exemplarily shown in FIG. 1, the service regions 10 and 20 of the edge data network of the MEC system and the mobile communication system may be an area (in case of reference numeral 20) capable of servicing the UE 50 by at least one UPF, or an area (in case of reference numeral 10) capable of servicing the UE 50 by two or more UPFs. In case of connection with the mobile communication system as such, the service regions 10 and 20 of the edge data network of the MEC system may be in the form of one base station area or combined two or more base station areas. Although the service area of the edge data network is not illustrated with only one base station area in FIG. 1, one base station area may be the service area of one edge data network if necessary.

As exemplarily shown in FIG. 1, the edge enabler servers 100 and 200 may be connected to or include the same or different edge application servers 101, 102, and 201, respectively. First edge application servers 101 and 201 and a second edge application server 102 may provide different edge computing services, respectively. The first application server 201 located in the service region 20 of the second edge data network that provides the same service as the first edge application server 101 located in the service region 10 of the first edge data network may provide the same edge computing service to the electronic device 50 through different edge enabler servers 100 and 200. As exemplarily shown in FIG. 1, the first edge application server 101 located in the service area 10 of the first edge data network may provide an edge computing service to the electronic device 50 connected to any one of the base stations 111, 112, 113, and 114 located in the first edge data network. The second edge application server 102 may provide an edge computing service to the electronic device 50 connected to any one of the base stations 111, 112, 113, and 114 located in the first edge data network.

The electronic device 50 may be provided with the edge computing service according to the disclosure, and may be a mobile terminal capable of accessing the mobile communication network through a wireless network. The electronic device 50 may include a variety of mobile electronic devices such as a smart phone, a tablet computer, a smart watch, a game machine, an automobile, a motorcycle, a bicycle, an airplane, a ship, etc. and/or various types of electronic devices capable of providing an IoT service. Furthermore, in a certain case, the electronic device 50 may be a device such as a personal computer (PC). In this case, the PC should have a function to access the mobile communication network. The electronic device 50 may be equipped with at least one edge computing service application 53 according to the disclosure, may include an edge enabler client 52 according to the disclosure, and may include a mobile terminal 51 performing a wireless communication function, for example, a communication layer.

Being equipped with the edge computing service application may mean that an application for receiving the edge computing service may be installed (or stored) in a memory (not shown) of the electronic device 50. Also, being equipped with the edge computing service application may mean that the application installed in the electronic device 50 is loaded into at least one processor to perform an operation for providing the edge computing service.

The edge enabler client 52 may be installed in the memory (not shown) of the electronic device 50 in which the application for receiving the edge computing service is equipped. In addition, the edge enabler client 52 may mean to be loaded into at least one processor instead of the installed application and to perform at least some of operations required by the edge computing service application.

The mobile terminal (MT) 51 may include a communication layer capable of communicating with a specific wireless communication network, for example, the 3GPP communication network in a configured manner. The communication layer may include at least one communication processor and/or a modem, and may include logic for transmitting and receiving radio signals and at least one antenna.

Hereinafter, the electronic device 50 will be referred to as a user equipment (UE) for convenience of description. In addition, unless particularly limited, a terminal or a mobile terminal to which reference numeral 51 is not added may be understood as an electronic device or a user equipment.

The base stations 111, 112, 113, 1113, 114, 211, and 212 have a predetermined area capable of communicating with the UE 50 in a set wireless communication scheme. For example, when the set wireless communication scheme uses the scheme of the 3GPP mobile communication network, the base stations 111, 112, 113, 1113, 114, 211, and 212 may be base stations in the 3GPP mobile communication network.

The above-described configuration of FIG. 1 exemplarily illustrates an edge computing deployment and a case of interworking with the 5G network among mobile communication networks.

The user plane function (UPF) devices 121, 122, and 221 may serve as gateways for transmitting packets corresponding to user data transmitted and received by the user equipment. According to an embodiment of the disclosure, the UPFs 121, 122, and 221 may be physically and/or logically close to the edge enabler servers 100 and 200 to support the edge computing service. Deploying the UPFs 121, 122, and 221 to be physically and/or logically close to the edge enabler servers 100 and 200 allows a data packet to be transferred directly to the edge data network without passing through the Internet, thus reducing transmission delay. That is, low-latency transmission is possible. According to another embodiment of the disclosure, the UPFs 121, 122, and 221 may also be connected to the edge enabler servers 100 and 200 via a data network connected to the Internet.

According to an embodiment of the disclosure, the edge computing system may be composed of the edge enabler servers 100 and 200, an edge configuration server or edge data network configuration server 30, the edge enabler client (EEC) 52. According to various embodiments of the disclosure, the edge enabler servers 100 and 200 may construct an edge hosting environment or an edge computing platform. Constructing the edge hosting environment or the edge computing platform may mean that the edge enabler server and at least one edge application server are connected or that at least one edge application server is running on a computing platform of the edge enabler server. Therefore, the edge enabler servers 100 and 200 may know information about the edge application server running in the edge hosting environment or on the edge computing platform.

According to various embodiments of the disclosure, the edge enabler servers 100 and 200 may negotiate with the UE 50 and thereby connect the application client 52 running in the UE 50 and the edge application server in the edge hosting environment. According to various embodiments of the disclosure, the UE 50 that supports the edge computing system may embed or be equipped with the edge enabler client 52 as described above. According to an embodiment of the disclosure, the negotiation between the UE 50 and the edge application server may be performed through interactions between the edge enabler client 52 in the UE 50 and the edge enabler servers 100 and 200. According to an embodiment of the disclosure, a layer in which interactions between the edge enabler client 52 and the edge enabler servers 100 and 200 such as the negotiation are performed may be referred to as an edge enabling layer. The terminal or UE 50 according to the disclosure may include an IoT device, a vehicle, or the like as well as the smart phone described above.

According to various embodiments of the disclosure, the edge configuration server 30 knows deployment information of the edge enabler servers 100 and 200, and may perform a function of transmitting configuration information for using the edge computing service to the UE 50. According to an embodiment of the disclosure, the configuration information may include at least one of edge data network connection information, edge data network service area information, and edge enabler server connection information. Without defining the edge data network separately, it can be seen that a local data network in which the edge enabler server and the edge application server are present corresponds to the edge data network. The edge configuration server may be referred to as ECS 30.

According to various embodiments of the disclosure, the edge data network connection information may include, for example, information such as a data network name and single-network slice selection assistance information (S-NSSAI). The network slice means that a device (or server) performing a specific function may be implemented in the form of a slice in a core network. For example, the UPF may be implemented as one server or network device. In another example, one server or network device may have two or more UPF slices therein. In still another example, the UPF may be implemented with two or more servers or may be implemented with two or more network devices. A specific network slice may be understood as a network device that performs one specific function logically.

According to various embodiments of the disclosure, the edge data network service area (region) may be, for example, at least one of or include two or more of a cell list, a list of tracking areas, and a network identifier (PLMN ID) of an operator. Also, the edge data network service area (region) may be a service area (region) of the edge enabler server that is set by the edge enabler server in the edge data network. Alternatively, in case of an edge data network deployment scenario using a local access data network (LADN), the edge data network area (region) may be the same as the LADN service area. That is, the UE 50 may receive, from the edge configuration server 30, information of the edge enabler server accessible at a specific location. If the edge configuration server 30 can know information about the edge application server running in the edge hosting environment of a specific edge enabler server, the edge enabler client 52 in the UE 50 can obtain the corresponding information from the edge configuration server 30. According to various embodiments of the disclosure, the edge enabler server connection information may be, for example, an endpoint address such as a uniform resource identifier (URI) or an Internet protocol (IP) address.

According to various embodiments of the disclosure, the UE 50 may receive information about an accessible edge enabler server from the edge configuration server 30, based on information such as a specific location, for example, a specific base station, a specific data network, or a specific physical location. According to an embodiment of the disclosure, if the edge configuration server 30 can know information about the edge application server running in the edge hosting environment of a specific edge enabler server, the UE 50 can also obtain the corresponding information through the edge enabler client 52.

According to various embodiments of the disclosure, the edge application servers 101, 102, and 201 may refer to third-party application servers running in the edge computing system. According to an embodiment of the disclosure, the edge application servers 101, 102, and 201 may be third-party application servers running on an infrastructure provided by the edge hosting environment, and may provide a low-latency service at locations close to the UE 50. According to various embodiments of the disclosure, information about an upper layer of a service provided to the UE 50 by the edge application server may be referred to as an application context. For example, when a user uses a real-time game application, all information necessary to regenerate a screen and a play phase currently viewed by the user in the game may be included in the application context. For example, in order for the UE 50 to use the existing service without interruption through connection to another edge application server, the application context should be relocated to the edge application server to be newly connected. In order to perform application context relocation, an edge application server capable of providing a service to an application running in the application client 53 of the UE 50 should be available. Availability of the edge application server in the edge data network may be determined depending on whether the edge application server is driven in the edge hosting environment, on the state of the edge application server, and the like.

In the edge computing system, the edge enabler servers 100 and 200, the edge application servers 101, 102, and 201, and the edge configuration server 30 can acquire terminal-related information from the mobile communication system. Specifically, for example, the 3GPP system may include a network exposure function (NEF) device which is a network entity that exposes a network function. In this case, at least one of entities constituting the edge computing system may include an application program interface (API). The entity of the edge computing system including the API may acquire terminal-related information by using the API.

According to various embodiments of the disclosure, as described above, the UE 50 may contain therein the application client 53, the edge enabler client 52 that enables the application client 53 to interact with the edge computing service, and the mobile terminal (MT) 51 that accesses the mobile communication system. According to various embodiments of the disclosure, an application of the UE 50 is an application provided by a third party and may refer to a client application program running in the UE 50 for a specific application service. Two or more applications may be running in the UE 50. According to an embodiment of the disclosure, at least one of these applications may use a multi-access edge computing (MEC) service. The edge enabler client 52 in the UE 50 may refer to a client that performs an operation in the UE 50 necessary for using the MEC service. According to an embodiment of the disclosure, the edge enabler client 52 may perform operations of identifying which application can use the edge computing service, and connecting the network interface such that data of the application client of the UE 50 can be transmitted to the edge application server providing the edge computing service. According to an embodiment of the disclosure, the UE 50 may establish a radio channel with the base station through the MT 51 in order to use the edge computing service. Establishing the radio channel may be performed in a communication layer of the MT 51, for example, a 3GPP communication layer. According to an embodiment of the disclosure, the communication layer of the MT 51 may establish a radio connection for data communication, register the UE 50 in the mobile communication system, establish a connection for data transmission to the mobile communication system, and transmit/receive data.

Meanwhile, the network functions (NFs) running in the 3GPP network illustrated in FIG. 1 or to be described below will be described as "devices". However, in actual implementation, each of the NFs may be implemented in the form of an instance in a single physical server.

In the disclosure, one instance may be implemented as specific software, and the software performing one instance operation may be implemented to run in one physical hardware device.

According to another embodiment of the disclosure, one instance may be running in two or more hardware servers rather than one physical hardware device, for example, two or more servers, or different racks constituting one server.

According to still another embodiment of the disclosure, two or more different instances may be running in one physical hardware device, for example, one server. In this case, at least some of the NFs illustrated in FIG. 1 may be running in the same physical hardware.

According to yet another embodiment of the disclosure, two or more instances performing the same function may be running in one physical hardware device. When two or more instances performing the same function are running in one physical hardware device, a target, e.g., user equipment (UE), to be controlled and/or serviced by each instance may be different. If one instance performs a specific operation for providing control and/or service to the same target, e.g., one UE, the one UE may have different identifiers for different services and/or controls.

In the following description, one NF will be described as one device for convenience of description. However, as described above, each of the NFs may be implemented as one or two or more instances, and all of these cases may be included. Also, other NFs not described above will be described as devices according to the above description. However, in actual implementation, each NF may be implemented as one or two or more instances.

Figure 2:
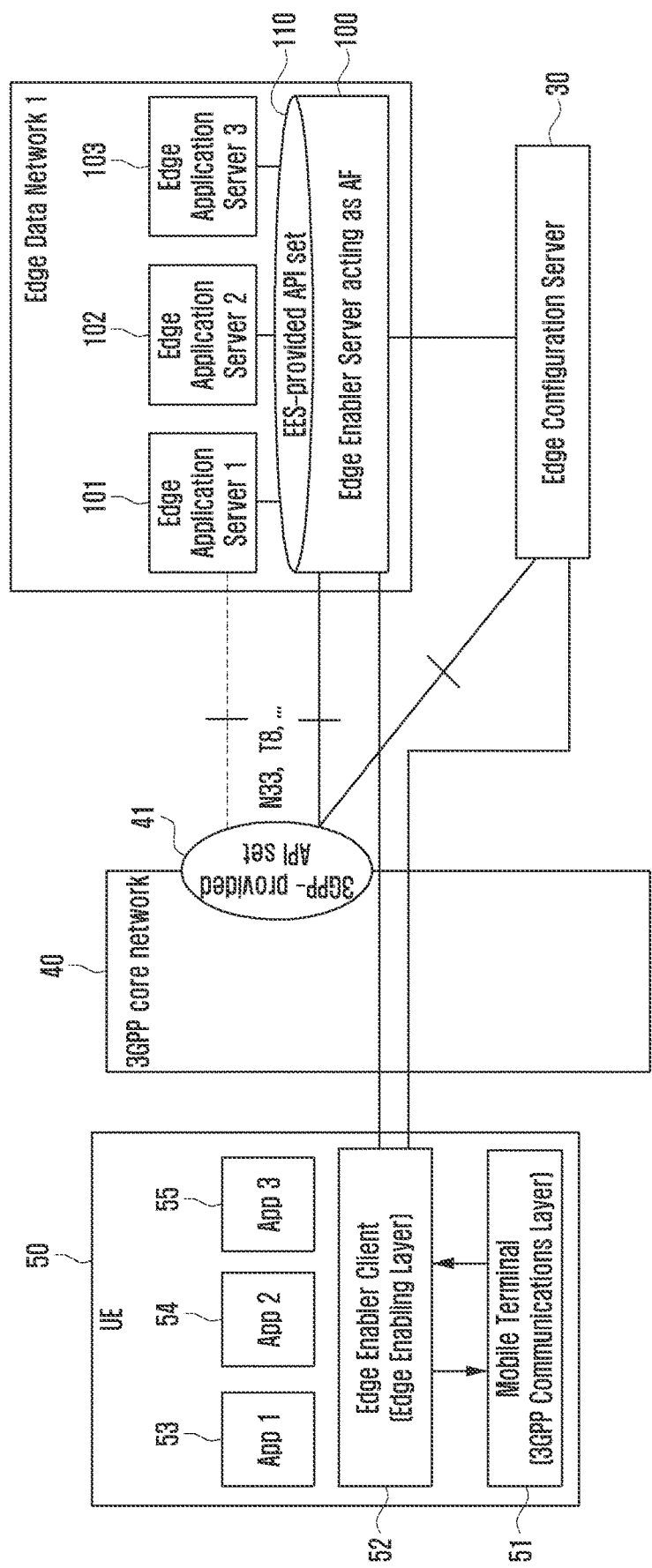
FIG. 2 is a diagram illustrating a structure of API-based connection among a user equipment, a mobile communication network, and an edge computing system according to an embodiment of the disclosure.

FIG. 2 is a diagram illustrating a structure of API-based connection among a user equipment, a mobile communication network, and an edge computing system according to an embodiment of the disclosure.

Referring to FIG. 2, the UE 50, the 3GPP core network 40 as an example of the mobile communication network, and the first edge data network are illustrated.

The UE 50 may correspond to the electronic device described above in FIG. 1. In the illustrated case, the UE contains therein the mobile terminal 51, the edge enabler client 52, and the plurality of applications 53, 54, and 55. The plurality of applications 53, 54, and 55 may be different edge service application. For example, the first application 53 may be an application for providing an edge computing service to the user by receiving a first edge computing service, the second application 54 may be an application for providing an edge computing service to the user by receiving a second edge computing service, and the third application 55 may be an application for providing an edge computing service to the user by receiving a third edge computing service.

Each of the applications 53, 54, and 55 may be provided with the edge computing service through the edge enabler client 52. In addition, each of the applications 53, 54, and 55 may be provided with the edge computing service from the edge data network by accessing a mobile communication network, for example, a base station of a 3PP network including the 3GPP core network 40, through the mobile terminal 51.

Although not illustrated in FIG. 2 for a radio access network (RAN) including a base station, it may be understood based on the scheme of FIG. 1. Also, the 3GPP network is illustrated as an example of the mobile communication network. According to an embodiment of the disclosure, the 3GPP core network 40 can provide an application program interface (API) set 41 composed of APIs that can be used by the application function (AF). The edge enabler server 100 or the edge application servers 101, 102, and 103, which can use (utilize) the AFs, can interact with the 3GPP network by using one or more specific APIs in the API set 41 provided by the 3GPP network.

In addition to the above description, the edge configuration server 30 may transmit/receive (via a scheme of request/response, subscription/notification, or the like) information necessary for the edge computing service to/from the 3GPP network through the API in the API set 41 provided by the 3GPP core network 40. Also, as above, the edge enabler server 100 may interact with the 3GPP network by using the API in the API set 41 provided by the 3GPP core network 40. Through this, even in case where an edge application server provider does not have a service level agreement with a 3GPP network operator, the edge enabler server 100 can provide an API set to the registered edge application servers 101, 102, and 103. In this case, the API set 110 provided by the edge enabler server 100 to the edge application servers 101, 102, and 103 may use the API set 41 received from the 3GPP core network 40 as it is. In another example, the API set 110 provided by the edge enabler server 100 to the edge application servers 101, 102, and 103 may be provided after processing the API set 41 received from the 3GPP core network 40 in the form of being recognizable in the edge application servers 101, 102, and 103. In still another example, the edge enabler server 100 may provide the edge application servers 101, 102, and 103 with only usable (utilizable) APIs in the API set 41 received from the 3GPP core network 40. Accordingly, the edge application servers 101, 102, and 103 can indirectly interact with the 3GPP core network 40 through the edge enabler server 100 in which they are registered. Alternatively, in some cases, the edge application servers 101, 102, and 103 may directly interact with the 3GPP core network 40 by using (utilizing) the API provided by the edge enabler server 100 in which they are registered.

On the other hand, even when the edge application server provider has a service level agreement with the 3GPP network operator so that the edge application servers 101, 102, and 103 can directly use the API set 41 provided by the 3GPP network, it may be configured to indirectly interact with the 3GPP network through the edge enabler server 100 for efficient API use.

First Embodiment

Hereinafter, operations of transferring edge application information between the edge data network and the 3GPP network according to the first embodiment of the disclosure will be described.

Figure 3:
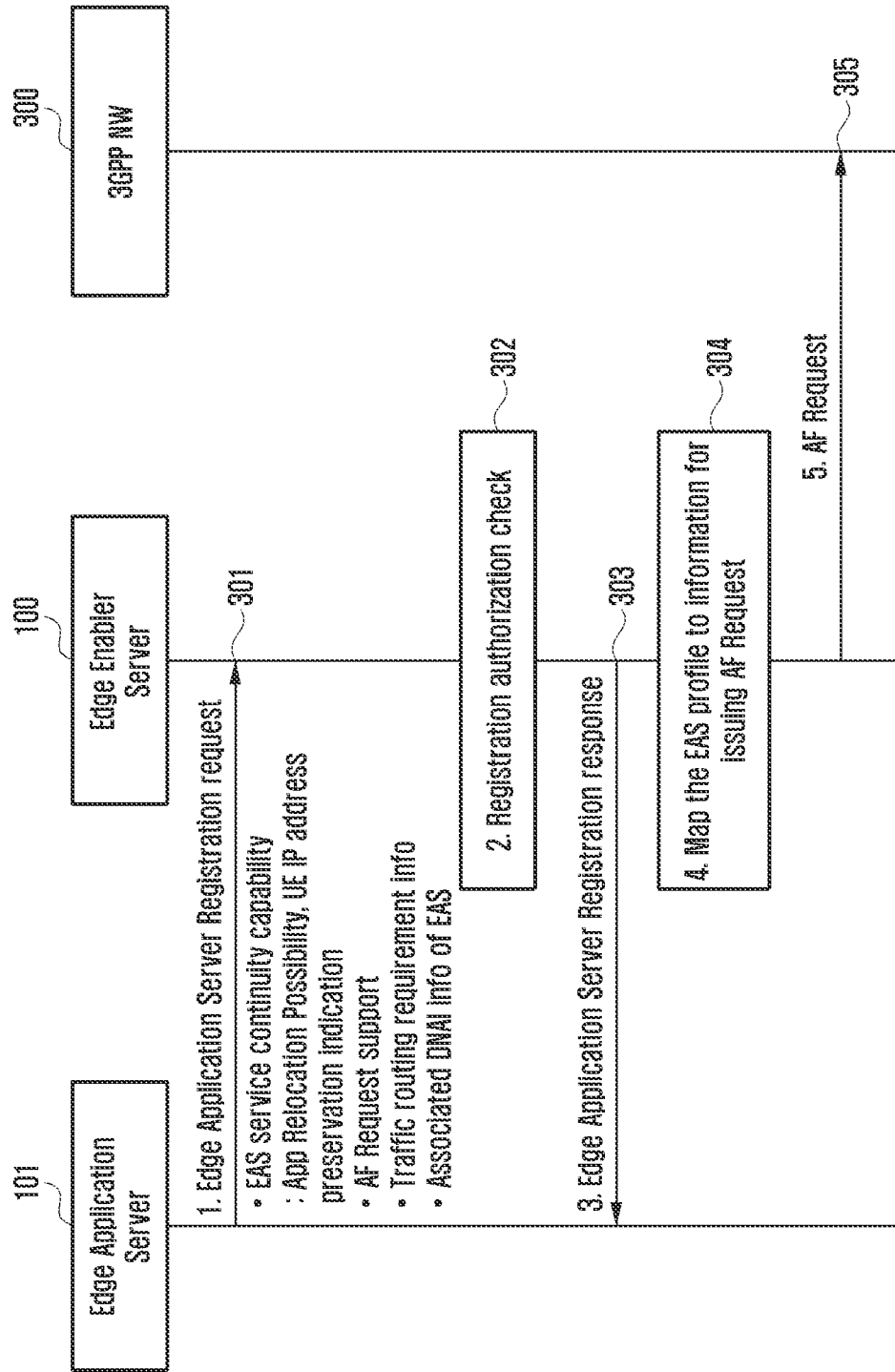
FIG. 3 is a diagram illustrating a signal flow for transferring edge application information required for AF request creation and transmission according to an embodiment of the disclosure.

FIG. 3 is a diagram illustrating a signal flow for transferring edge application information required for AF request creation and transmission according to an embodiment of the disclosure.

At step 301 (step 1), the edge application server (EAS) 101 may transmit a registration request message to an edge enabler server (EES) 100 in which the EAS can be registered. An example of the EES 100 in which the EAS 101 can be registered will be described with reference to FIG. 1. In case of the first EAS 101 and the second EAS 102 running in the edge hosting environment of the EES 100, the EES 100 becomes an EES in which both EASs can be registered. In case of the first EAS 201 running in the edge hosting environment of the EES 200, the EES 200 becomes an EES in which the EAS can be registered. In the following embodiment, it is assumed that the first EAS 101 running in the edge hosting environment of the EES 100 transmits a registration request message.

An operation of transmitting the registration request message will be described as an example. The EES 100 may acquire the following information from the EAS 101 through an edge application server registration procedure. The information that the EES 100 can acquire at the time of transmitting the edge application server registration request message may be at least one of EAS service continuity capability/support, AF request support, traffic routing requirement information, EAS data network access identifier (DNAI) information, and AF transaction identifier. When the edge application server registration request message includes the AF transaction identifier, information (e.g., subscription correlation ID, notification target ID, etc.) related to a subscription performed through an AF transaction that can be identified through the AF transaction identifier may be included in the edge application server registration request message. In another example, the above information may be transferred from the EAS 101 to the EES 100 through a separate procedure other than the edge application procedure.

The above-mentioned information acquired when the edge application server registration request message is transmitted will be described in more detail.

The EAS service continuity capability/support information provided by the EAS 101 may include at least one of stateful/stateless type information of a service, whether there is a capability of performing application context transmission, and whether it is necessary to ensure the preservation of a UE IP address. The stateful/stateless service type may be information indicating whether there exists a continuous operation or service state between a client (e.g., the EEC 52 of the UE 50) and a server (e.g., the EAS) and whether the service is a type of requiring the corresponding state information in order for the client to receive continuously the service. For example, when the service type is "stateful", a continuous operation or service state may exist between the EEC 52 and the EAS, and the EEC 52 may be in a state of desiring a continuous service. Conversely, when the service type is "stateless", there may be no continuous operation or service, or even if the service exists, it may be in a state of desiring no continuous service.

Such information included in the edge application server registration request message may be mapped to an application relocation possibility and a UE IP preservation indication by the EES 100 or may be referred to when generating an AF request message by generating the corresponding information.

Here, when generating the AF request message, a case where the EAS service continuity capability/support information indicates that the EAS provided service is stateful and that the EAS can perform application context transfer to another EAS may be interpreted as follows. The EES 100 may indicate the application relocation possibility in the AF request. Here, this indication of the application relocation possibility in the AF request may be an indicator that instructs a specific network function device of the mobile communication network, e.g., the 3GPP network, involved in session management of the UE to wait for acknowledgement or notification regarding the completion of the application context relocation from the EES 100 before configuration and activation of a user plane path.

Next, the AF request support information may include information about whether the EAS 101 can directly transmit the AF request message to the 3GPP network device (network exposure function, policy and charging function, session management function, access mobility function, etc.), and information about whether it will directly transmit the AF request message (responsibility for AF request). In an example, the EAS 101 can directly transmit the AF request message, but if desiring to delegate the AF request message to the EES 100, the corresponding indication may be included in the AF request support information.

Specifically, if the AF request support information indicates that the EAS 101 cannot directly transmit the AF request message or indicates that the responsibility/operation for the AF request message is delegated to the EES 100, the EAS 101 may transmit the AF request message to the mobile communication network through the EES 100, when interactions are required, without directly interacting with the 3GPP network. To this end, after the EAS 101 performs the EAS registration operation, the EES 100 may transmit the AF request message for the corresponding EAS 101 to the 3GPP network.

Next, the traffic routing requirement information may include all kinds of information (e.g., routing profile ID, N6 routing information, etc.) required to route the application data traffic of the UE to the edge application through the N6 interface. If the purpose of AF influence is N6 traffic routing, corresponding information should be included. In addition, it is possible to configure and transfer traffic routing requirement information for each DNAI.

If the traffic routing requirement information is provided from the EAS 101, the EES 100 should insert the traffic routing information about interface-related information (e.g. DNAI), etc. for access to the corresponding EAS or EAS in the AF request message when transmitting the AF request message having the purpose of establishing traffic routing.

Next, the EAS DNAI information may contain DNAI information of the data network required for the EAS 101 access when the EAS 101 is accessible through a mobile communication network, e.g., 5G core (5GC). A plurality of DNAIs may be used for one EAS access. The DNAI information may be used to specify a UPF that supports the corresponding DNAI (a plurality of UPFs may correspond to one DNAI).

When the EES 100 is provided with the EAS DNAI (The EES 100 may acquire DNAI information from the EAS 101 in various methods. For example, it may be in local configuration by receiving network configuration information (e.g., UPF-related information) of an operator or acquired from a node (e.g., an orchestrator and management node) in charge of EAS installation (instantiation)), the EES 100 may collect the EAS DNAI information providing the same service and include/map it in/to potential application location information. In addition, the provided DNAI may be mapped to an AF-service identifier by the EES 100 and included in the AF request message transmitted to the network exposure function (NEF) device.

Also, in case of acquiring the DNAI information of the EASs, the EES 100 may receive UE's accessible DNAI information (target DNAI) according to a user plane path change of the UE from the 3GPP network, map it to the DNAI for each EAS, and select a new EAS according to the movement of the UE.

The above-described operation of the EES 100 for mapping the EAS DNAI information and the EAS service area and potential application location information may also be performed by the edge configuration server 30. Further, the edge configuration server (ECS) 30 may perform mapping between the EES DNAI information and the EES service area (or the EDN service area). For example, when the EES DNAI information is given, the ECS 30 may define/infer/map the EES service area based on the service area of the UPF connected to the EES DNAI, and also define/infer/map the edge computing service area based on the DNAI information of all the EESs connected to the ECS 30. Operations of the ECS 30 based on the EES DNAI information or the EES service area will be described below with reference to FIGS. 7 to 9.

The AF transaction identifier (ID) may include specific information related to the AF request message having been performed for direct interactions between the EAS 101 and the 3GPP network. Using the AF transaction ID information, information on the previously performed AF request can be obtained. For example, if the purpose of the AF request is to receive a notification for a specific event from the 3GPP network device, subscription information for the notification can be checked through the AF transaction ID. For example, it is possible to check whether a subscription to a user plane (UP) path change event notification or UE location reporting for a specific UE has been performed, or check related information (subscription correlation ID, notification target ID, notification correlation ID, etc.).

At step 302 (step 2), the EES 100 may check EAS registration authorization, and at step 303 (step 3), the EES 100 may transmit an EAS registration response message to the EAS 101. In this case, the EES 100 may store the information provided by the EAS 101 in an internal memory (not shown) and transmit the EAS registration response message.

Through steps 301 to 303, the EAS registration procedure may be completed. After the completion of the EAS registration procedure, the EES 100 may create at step 304 (step 4) an AF request message by using the EAS information stored in the previous procedure, and transmit the created AF request message to a mobile communication network, e.g., the 3GPP network 300 at step 305 (step 5). Here, the 3GPP network 300 may refer to all of the base stations 111, 112, 113, 114, 211, and 212 shown in FIG. 1 and the 3GPP core network 40 shown in FIG. 2. In case where the disclosure is actually applied, the 3GPP network 300 may be a specific network function (NF) device capable of communicating with the edge data network when the 3GPP core network 40 is implemented as 5GC. On the other hand, when the 3GPP core network 40 is implemented as 4GC, the 3GPP network 300 may be a specific network node capable of communicating with the edge data network.

A time point when the EES 100 transmits the AF request message as in step 305 may be the following two cases. First, the AF request for the service provided by the EAS 101 may be transmitted to the 3GPP network 300 immediately after the EAS registration. Second, the AF request may be transmitted to the 3GPP network 300 after an EAS discovery request message for the EAS 101 is received.

In any one of the above two cases, the EES 100 may transmit the AF request message to the 3GPP network 300 by using information in an EAS profile stored in the EES 100.

In case of creating the AF request message, information on potential locations of applications may be generated by collecting DNAI information of EASs providing the same service among EASs registered in the EES 100. The information on potential locations of applications may be included in the AF request message and transmitted to the 3GPP network 300. In this case, the 3GPP network 300 may be, for example, one of NEF (not shown), SMF (not shown), PCF (not shown), and UDR (not shown).

In addition, when creating the AF request message, the EES 100 may configure a spatial validity condition and a temporary validity condition in the AF request message, based on the EAS service area and EAS schedule information. In particular, in case where a plurality of EASs providing the same service exist and are registered in the EES 100, such validity conditions may be configured by aggregating the service area and schedule information of the EASs. If there is a geographic zone identifier that is configured between the EES 100 and the 3GPP network 300, the spatial validity condition may be configured in the AF request message by mapping the EAS service area information to the geographic zone identifier. In another example, the EES 100 may infer a geographic service area based on the obtained EAS DNAI information or map a DNAI value to the geographic zone identifier and then configure it as the spatial validity condition.

In addition, the EES 100 may map the EAS service area and the DNAI, based on the EAS service area information and the network installation information of the 3GPP network 300. If the EAS 100 does not provide DNAI information, the EES 100 may map the EAS service area information to the DNAI, and define a potential application location by collecting the mapped DNAIs. When a specific DNAI is given, for example, when an EAS request for a specific DNAI is received from the 3GPP network 300, the EES 100 may identify (check), based on the potential application location (EAS DNAI list) defined as described above, whether the EAS corresponding to the specific DNAI has been registered in the EES 100.

The EAS service continuity support information provided by the EAS 101 includes information on whether application context transfer/relocation can be performed. If it is configured to be performed, the EES 100 may map corresponding information to the application relocation possibility information when creating/transmitting the AF request message.

In the embodiment described above, a time point when the EES 100 transmits the AF request message may be one of the following time points.

First, after the EAS registration procedure is completed, an AF request message may be transmitted in advance to UEs to access the EAS 100. The AF request message may be transmitted in advance for determining routing for traffic provided to all UEs accessing EAS DNAI acquired through the EAS registration procedure or other routes. That is, before the connection between the edge application client (EEC) 52 in the UE 50 and the EAS 101 is established, the AF request message may be transmitted in advance.

Second, the AF request message may be transmitted after the EAS registration procedure, after the EES 100 receives an EEC registration request message or an EAS discovery request message from the UE 50, and after detecting that application data traffic between the UE 50 and the EAS 101 will occur.

Third, after the EAS registration, EEC registration, and EAS discovery procedures are completed, and after a PDU session in which application data traffic can be exchanged between the UE 50 and the EAS 101 is established, the AF request message may be transmitted for the established session.

Second Embodiment

Hereinafter, procedures for a user plane path management between an edge computing network and a mobile communication network according to a second embodiment of the disclosure will be described.

Figure 4:
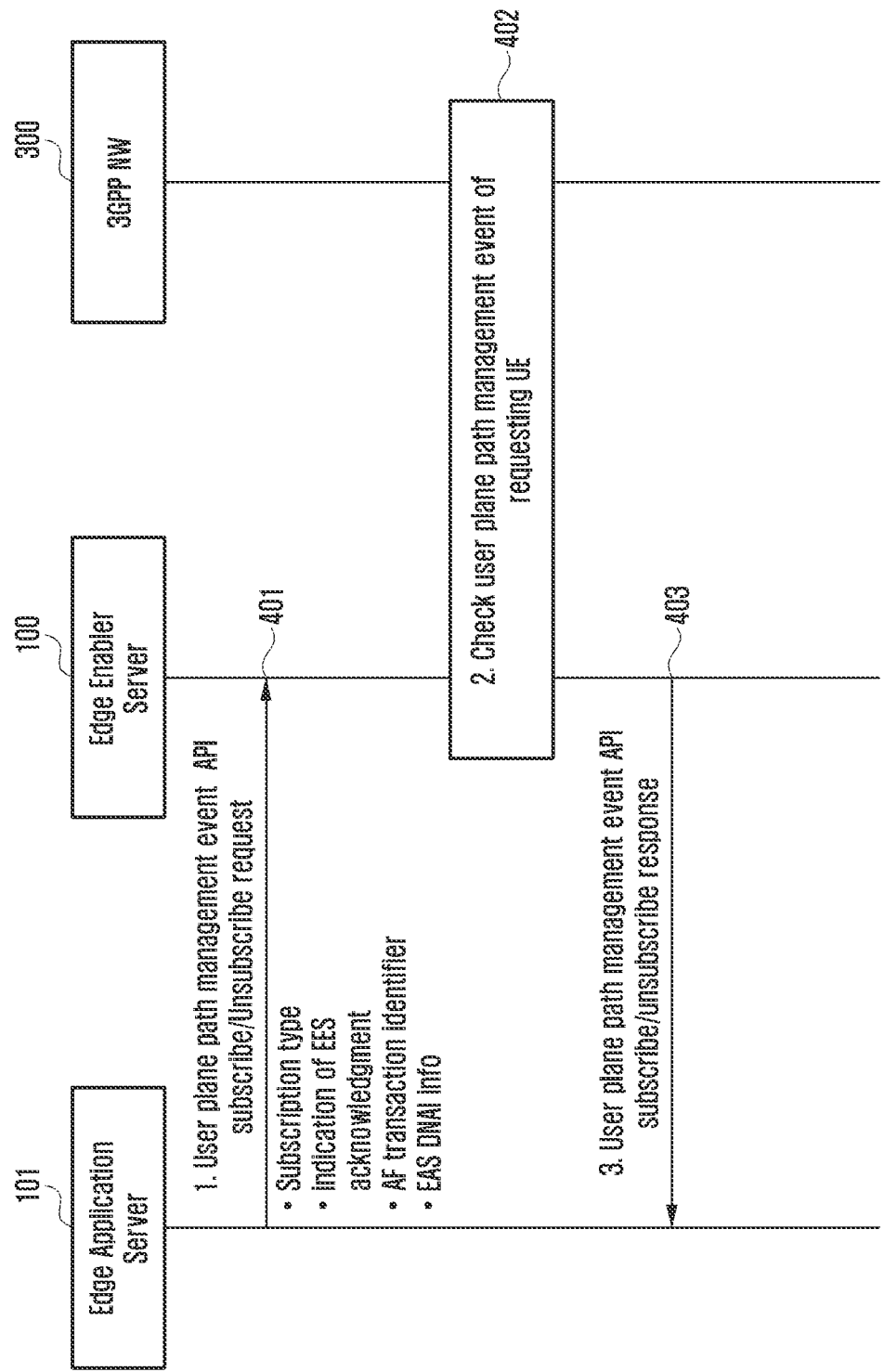
FIG. 4 is a diagram illustrating a signal flow for a user plane (UP) path management event notification according to an embodiment of the disclosure.

FIG. 4 is a diagram illustrating a signal flow for a user plane (UP) path management event notification according to an embodiment of the disclosure.

In the description of FIG. 4, it is assumed that nodes of the edge data network are the EAS 101 and the EES 100 in FIG. 1 described above, and the 3GPP network 300 may be at least one node included in the 3GPP core network in FIG. 2.

At step 401 (step 1), the EAS 101 transmits a user plane (UP) path management event application program interface (API) subscribe request message to the EES 100. This message may include at least one of a subscription type (preference or indication), AF ACK preference, AF transaction identifier, and EAS DNAI information.

The EAS 101 may transmit a subscribe type or notification type related configuration (early notification and/or late notification) included in the subscription type. By transmitting the subscribe type or notification type related configuration, the EAS 101 enables the EES 100 to configure a subscribe type for the UP path management event notification of the 3GPP network 300. For example, the EAS 101 may receive a notification in advance before a new UPF configuration is performed (immediately after UP path change detection) according to the mobility of the UE providing the service, and then advance a time point of starting to perform a subsequent operation, for example, application context relocation, as follows. The early notification may be configured as the subscribe type or notification type and included in the UP path management event API subscribe request message. In another example, in case of desiring to receive a notification just before activation after UPF configuration, the late notification may be configured as the type and included in the request message. Case of desiring to receive both the early notification and the late notification is also possible.

A configuration for the subscription/notification type as described above may be directly determined by the EES 100 itself without receiving a message about the type from the EAS 101.

For example, based on the EAS information acquired through the EAS registration procedure (e.g., FIG. 3 described above), the EES 100 may configure the notification type to early or late depending on the time required for the EAS 101 to perform application context transfer or on the application context size, and include it in the AF request message. For example, if the size of the application context to be transferred (relocation) by the EAS 100 is large, the AF request message may be configured as the early notification and transmitted.

Figure 5:
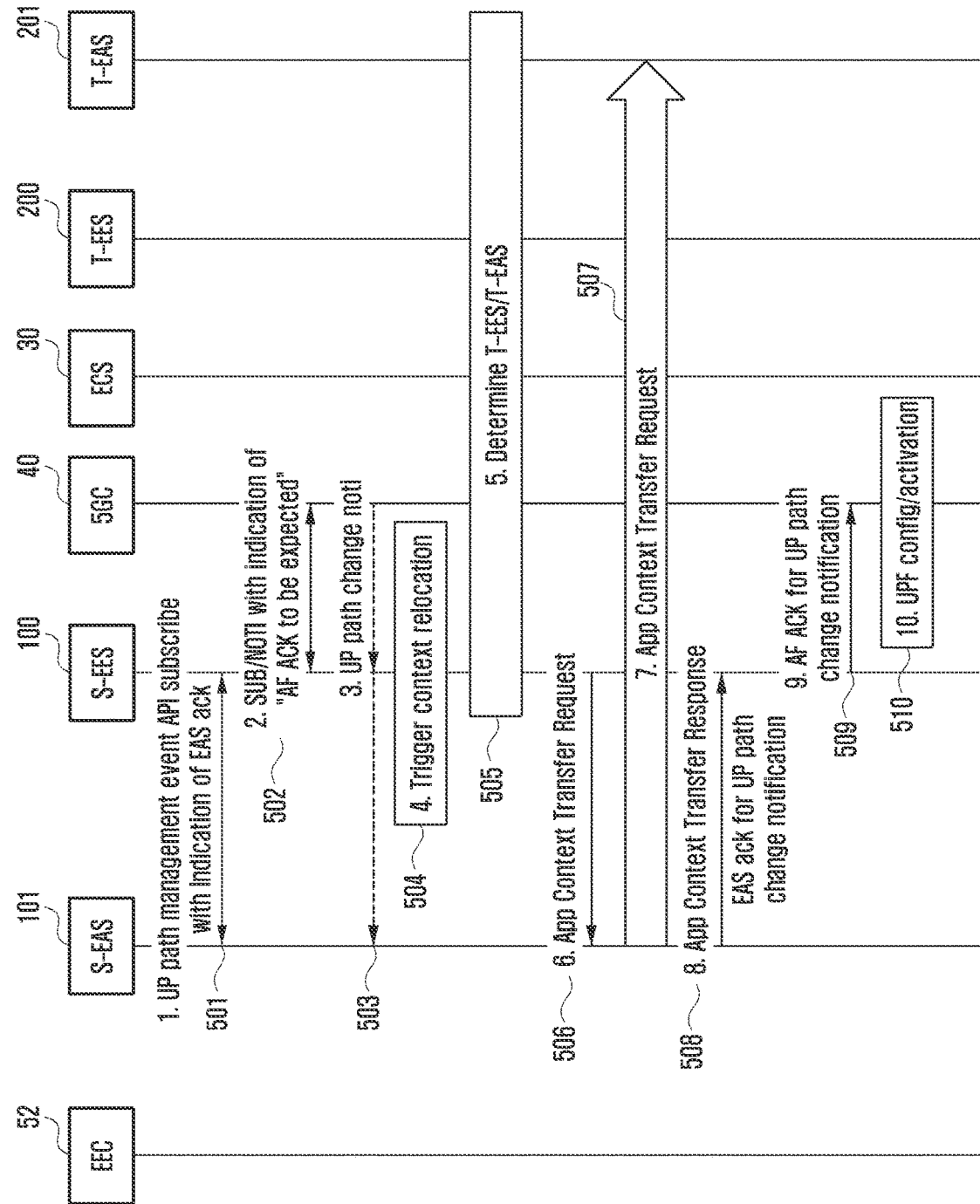
FIG. 5 is a diagram illustrating a signal flow for providing a user plane path management event notification message when AF acknowledgment preference is configured according to an embodiment of the disclosure.

The EAS 101 may enable the SMF (not shown) in the 3GPP network 300 to wait for the acknowledgment of the AF before performing the UPF configuration or UPF activation according to the UP path change. For this, the AF ACK preference (or indication of EAS acknowledgment) may be configured and included in the UP path management event API request message to be transmitted to the EES 100. Upon receiving the corresponding indication, the EES 100 may be configured to include an indication of "AF acknowledgment to be expected" when performing a subscription for the UP path management event notification for the 3GPP network 300. In addition, when the UP path change event occurs, the AF acknowledgment may be transmitted to the SMF after it is recognized that the EAS 101 has completed the app context relocation/transfer operation. In case where the indication of EAS acknowledgment is configured, a detailed subsequent operation is illustrated in FIG. 5 to be described below, and thus a detailed description thereof will be omitted.

Even if the EAS 101 does not provide the above AF ACK preference or indication of EAS acknowledgment, the EES 100 may configure the corresponding parameter by itself with reference to EAS profile information. For example, the subscription/notification type may be configured based on EAS service continuity support, EAS service type, or EAS service key performance indicator (KPI) included in latency-related information.

If the EAS 101 has performed a subscription for the previous UP path management event notification or the EAS 101 has related information, the EAS 101 may provide the subscription parameter such as AF transaction identifier or subscription correlation ID/notification correlation ID for the related past operation to the EES 100. Upon receiving such information, when the EES 100 generates an AF request message, the EES 100 may be configured by including AF subscription information (information on AF subscription to corresponding SMF events) in the AF Request message based on the information on the subscription-related parameter provided by the EAS 101.

Through the above operation, when the EES 100 receive the UP path management event API subscribe request message, the EES 100 may check a UP path management event between a specific node of the 3GPP network 300 and the requested UE, at step 402 (step 2). That is, based on the information at the above-described step 401, the EES 100 may perform a procedure for receiving a notification about the occurrence of a UP path management event with a specific node of the 3GPP network.

Through the step 402, the EES 100 may check whether to subscribe to the UP path management event, and if necessary, the EES 100 may subscribe to the UP path management event to the 3GPP network device. At step 403 (step 3), the EES 100 may generate a user plane path management event API subscribe/unsubscribe response message and transmit it to the corresponding EAS 101.

Third Embodiment

Hereinafter, a procedure for UP path management event notification when AF acknowledgment preference is configured according to a third embodiment of the disclosure will be described.

FIG. 5 is a diagram illustrating a signal flow for providing a user plane path management event notification message when AF acknowledgment preference is configured according to an embodiment of the disclosure.

In describing FIG. 5, it is assumed that among nodes of the edge data network, the EAS 101 and the EES 100 of FIG. 1 are source nodes, and the EAS 201 and the EES 200 of FIG. 1 are target nodes. In addition, it is assumed that the 3GPP network 300 is implemented with the 5GC 40.

At step 501 (step 1), the source-EAS (S-EAS) 101 may include an indication of EAS acknowledgment or AF acknowledgment in the UP path management event API subscribe request message and provide it to the source-EES (S-EES) 100. In this case, at step 502 (step 2), the S-EES 100 may include an indication of "AF acknowledgment to be expected" in the AF request message and transmit a subscribe operation for the UP path management event notification to the 3GPP network, that is, a specific network function (NF) device (e.g., NEF, PCF, or SMF) of the 5GC 40.

Upon the receiving the message in step 502, when a UP path change event occurs, that is, at step 503 (step 3), the 5GC 40 may provide a related notification to the S-EES 100 and/or the S-EAS 101. If the indication of "AF acknowledgment to be expected" is included at the step 502, the 5GC 40 sends a notification about the UP path change event to the S-EES 100 and waits for the reception of the AF acknowledgment message without immediately performing UPF configuration and activation according to the UP path change. If the above indication is not included, the 5GC device (e.g., SMF) may immediately perform the UPF configuration and activation (configuration is possible based on N6 routing information provided from the AF request message). The 5GC device (e.g., SMF) may also receive the N6 routing information from the T-EES 200 or the T-EAS 201. The S-EES 100 which received the UP path change event message from the 3GPP network, may start an application context relocation procedure at step 504 (step 4).

At step 505, the S-EES 100 may perform a procedure for receiving, through other EAS and other EES, the user plane data to be provided to the UE through the ECS 30 according to the movement of the UE or the change of the UPF. For example, the S-EES 100 may inquire of the ECS 30 about a target EAS capable of providing the user plane data to the UE and an EES including the target EAS, and receive related information. Therefore, the S-EES 100 may determine the T-EES 200 and/or the T-EAS 201 based on the information acquired from the ECS 30. The T-EES 200 or T-EAS 201 determined at the step 505 may provide N6 routing information for DNAI connected to the T-EAS 201 to the S-EES 100 (e.g., the S-EES 100 may request and receive the corresponding information from the T-EES 200). The S-EES 100 may perform step 509 below based on the N6 routing information for the T-EAS 201 received from the T-EAS 201 or the T-EES 200, or perform AF request to influence traffic routing through a separate operation.

Thereafter, at step 506 (step 6), the S-EES 100 may transmit an application context transfer request message to the S-EAS 101. At step 507 (step 7), the S-EAS 101 may transfer the application context to the T-EAS 201 directly or through the S-EES 100.

After performing the above-described steps 504 to 507, the S-EAS 101 may transmit an EAS acknowledgment message (or via the application context transfer response message) to the S-EES (100) at step 508 (step 8) in order to inform that the UPF configuration or activation according to the UP path change may be performed.

At step 509 (step 9), the S-EES 100 that has received the corresponding acknowledgment message may transmit an AF acknowledgment message to a specific network function of the 3GPP network 40, for example, NEF and/or SMF, in order to inform that UPF configuration/activation is possible.

At step 510 (step 10), the specific node, e.g., SMF, of the 3GPP network that has received the AF acknowledgment message from the S-EES 100 may perform the UPF configuration/activation. That is, configuration/activation of UPF for transmitting the user plane data between the UE 50 and the T-EAS 201 may be performed. In this regard, referring to FIG. 1, the operation of the 3GPP network may be as follows. First, it is assumed that the edge computing service is provided to the UE 50 through the second UPF 122. When the SMF receives the AF acknowledgment message directly from the S-EES 100 or through another NF of the 3GPP, the SMF may determine the UPF 221 to receive data from the T-EAS 201 through the T-EES 200 or directly from the T-EAS 201. Therefore, the UPF2 122 of the first edge data network 10 may stop the transmission of user plane data to the UE 50, and the UPF1 221 of the second edge data network 20 may be activated to transmit user plane data to the UE 50.

Figure 6:
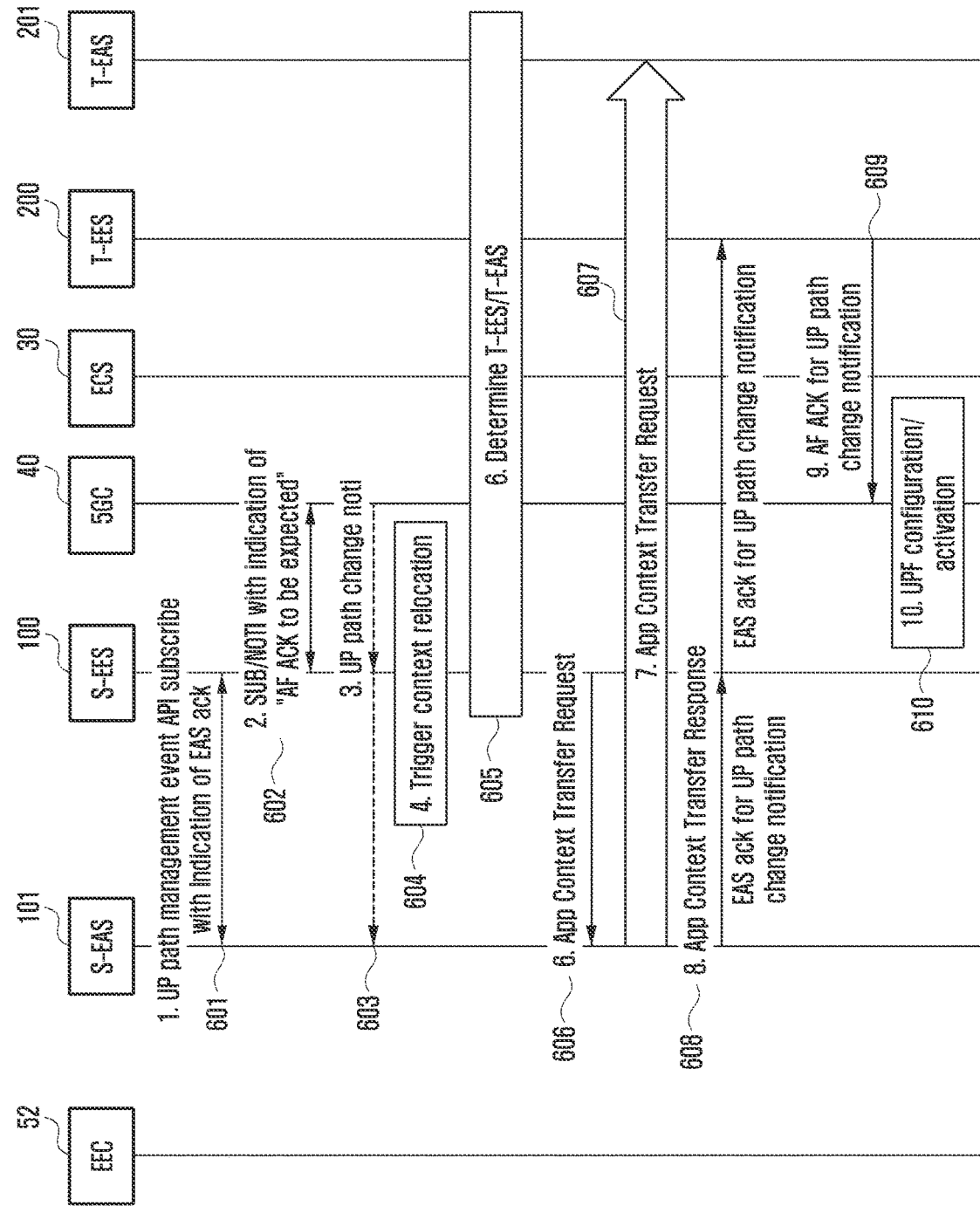
FIG. 6 is a diagram illustrating a signal flow for providing a user plane path management event notification message when AF acknowledgment preference is configured according to an embodiment of the disclosure.

FIG. 6 is a diagram illustrating a signal flow for providing a user plane path management event notification message when AF acknowledgment preference is configured according to an embodiment of the disclosure.

In describing FIG. 6, it is assumed as in FIG. 5 that among nodes of the edge data network, the EAS 101 and the EES 100 of FIG. 1 are source nodes, and the EAS 201 and the EES 200 of FIG. 1 are target nodes. In addition, it is assumed that the 3GPP network 300 is implemented with the 5GC 40.

In addition, when FIG. 6 is compared with FIG. 5, steps 501 to 508 may be the same operations as steps 601 to 608 of FIG. 6. Hereinafter, a difference between FIG. 5 and FIG. 6 will be described.

First, the operation of the S-EAS 101 that transmits the application context transfer response message to the S-EES 100 at step 608 may be the same as that of FIG. 5 described above. In FIG. 6, the S-EES 100 may transmit an S-EAS response message for a UP path change notification to the T-EES 200 in response to the application context transfer response message received from the S-EAS 101. That is, the S-EES 100 may receive an acknowledgment message from the S-EAS 101 and then transfer it to the T-EES 200. Upon receiving the acknowledgment of the S-EAS 101, the T-EES 200 may send an AF acknowledgment message to the SMF of the 5GC 40 at step 609 (step 9) instead of the S-EAS 101 or the S-EES 100 (in case where the UE 50 has performed EEC registration to the T-EES 200 or is out of the spatial validity condition of the AF request message issued by the S-EES 100). The SMF of the 5GC 40 that has received this may perform UPF configuration/activation at step 610 (step 10). Here, the operation of the SMF performing the UPF configuration/activation may be the same operation as described with reference to FIG. 5. Therefore, the redundant description thereof will be omitted.

Figure 7:
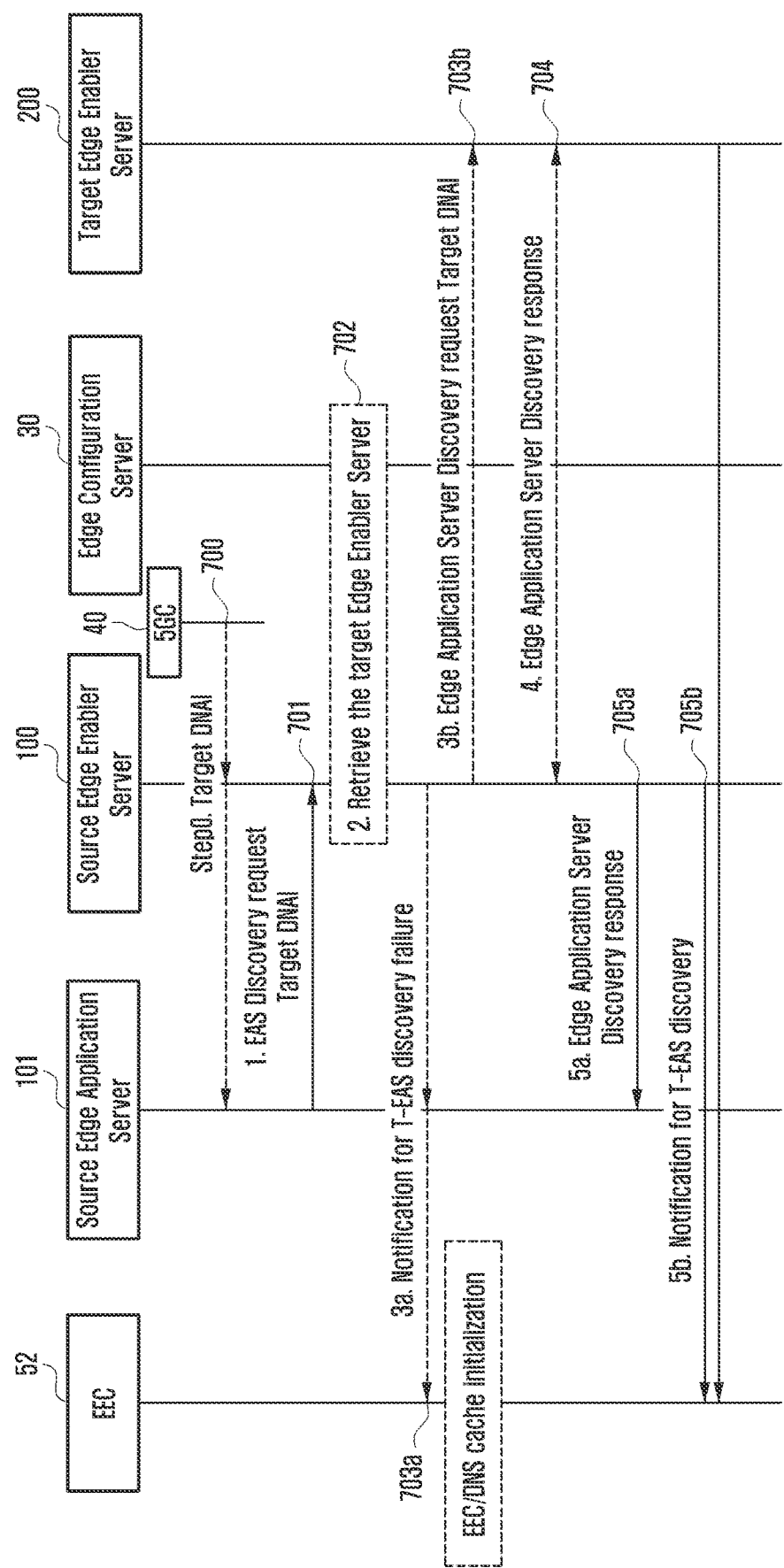
FIG. 7 is a diagram illustrating a signal flow for a T-EAS discovery operation based on DNAI of EES according to an embodiment of the disclosure.

FIG. 7 is a diagram illustrating a signal flow for a T-EAS discovery operation based on DNAI of EES according to an embodiment of the disclosure.

In describing FIG. 7, it is assumed that among nodes of the edge data network, the EAS 101 and the EES 100 of FIG. 1 are source nodes, and the EES 200 of FIG. 1 is a target node. In addition, it is assumed that the 3GPP network 300 is implemented with the 5GC 40. It is also assumed that the following operations have been performed before the signal flow shown in FIG. 7.

First, as previously described in the embodiments of FIGS. 3 to 6, the EES 100 has known DNAI information (e.g., EAS DNAI) used to access the EAS 101 or the edge data network in which the EAS 101 is installed. The EAS DNAI information may be locally configured in the EES 100, provided directly from the EAS 101, or provided from an orchestrator & management system node (not shown).

Second, the EES 100 is in a state that it has created the AF request message instead of the EAS 101 and has performed the subscription to the UP path management event notification message to the 3GPP network 40. In addition, the AF request message created/transmitted by the EES 100 may include DNAI information connected to the EAS 101 or the EES 100 (EAS DNAI information may be designated as a potential location of application).

At step 700 (step 0), the source EES (S-EES) 100 may receive a user plane (UP) path change notification message from the 3GPP network (e.g., 5G core network) 40. In this case, the UP path change notification message may include a target DNAI value used by the UE 50 to access the data network through a new UP path. The source EES 100 may transfer (forward) the above notification message to the source EAS 101.

At step 701 (step 1), the source EAS 101 may receive the target DNAI value through the UP path change notification message from the source EES 100, and check (identify) whether the target DNAI is a DNAI accessible to the source EAS itself. If the target DNAI does not provide a connection with the source EAS (e.g., in case of a DNAI connected to a UPF that is not included in the EAS service area), or if it is a UP path that causes an additional delay even if connection is possible, an EAS discovery request message for selecting a new EAS (target EAS) may be transmitted to the source EES 100. Therefore, the source EAS 101 may configure a discovery reason of the EAS discovery request message to a UP path change and include the target DNAI in the EAS discovery request message.

At step 702 (step 2), the source EES 100 may compare the target DNAI included in the EAS discovery request message with the DNAI values of the EAS registered or stored therein and, based on this, determine whether to interact with the edge configuration server 30.

First, if there is an EAS DNAI value that matches the target DNAI, and if the EAS connected to the DNAI can provide the same service as the source EAS, the source EES 100 may transfer the target EAS information registered therein to the source EAS 101 without a need to interact with the edge configuration server 30 to discover the target EES. In this case, it may be configured to perform step 705 (step 5) without performing steps 703 to 704 illustrated in FIG. 7.

Second, if there is no EAS DNAI value that matches the target DNAI, the source EES 100 may perform interactions with the ECS 30. The second case may be further classified as follows.

(1) In order to interact with the ECS 30, the target DNAI provided from the 3GPP network 40 may be transmitted to the ECS 30. In response, the ECS 30 may select the target EES based on the target DNAI. If the EES does not provide the target DNAI and only provides UE information or source EAS information (e.g., EAS ID, type, endpoint address, etc.) connected to the UE, the ECS 30 may interact with the 3GPP network 40 and acquire the location of the UE or the DNAI value. The ECS 30 may provide target EES information (such as ID and address information) selected based on the target DNAI to the source EES 100. In FIG. 7, the target EES will be described as the EES 200 described in FIG. 1. As such, the EES 100 that has received the target EES information provided by the ECS 30 can perform the target EES interaction step 703b (step 3b).

(2) In case of failing to acquire information on the target EES through interactions with the ECS 30, the ECS 30 may check whether there is a target EES connectable based on the target DNAI received from the source EES 100. In case of failing to discover a target EES or target EAS connectable through the target DNAI (in case that the target DNAI value is connected to a data network that does not provide access to the edge computing server (EAS or EES)), it may be determined that the edge computing service is not supported in the current region (the moved region) of the UE 50. Therefore, the UE needs to receive a service from the central server, and for this, step 703a (step 3a) may be performed.

The step 703a (step 3a) will be described. This is the case where the source EES 100 fails to discover the edge computing server (EES or EAS) accessible through the target DNAI as a result of interactions with the ECS 30. Therefore, the UE 50 should perform an operation for accessing the central server without finding a new EAS. For this, a notification message may be transmitted to the UE 50. This notification message may indicate a target EAS discovery failure or an edge computing service unavailability.

[A]. In case of the target EAS discovery failure, there may exist a case of performing continuous access to the existing source EAS. That is, this may be a case of continuing communication with the existing source EAS 101 and the source EES 100.

[B]. In case of the target EAS discovery failure, a case of performing access to the central server is also possible. In this case, (1) the corresponding EAS information (related information such as EAS address and EAS type) and lifetime stored in a cache and DNS cache in the EEC 52 of the UE may be initialized/deleted and DNS query is performed. (2) The above notification message may be transmitted to the source EAS 101, and the source EAS 101 may perform application context transmission to the central server (not shown).

The step 703b (step 3b) will be described. The source EES 100 may transmit an EAS discovery request message to the target EES 200 obtained as a result of interactions with the ECS 30. In this case, the source EES 100 may transmit the target DNAI by including it in the EAS discovery request message. The EAS discovery request message may include information related to the source EAS 101 (ID and address information) and information related to the UE having received a service from the source EAS 101. In order to obtain UE identifier and UE-related information, the UE-related information may include information (3GPP network function ID, address, AF transaction ID, subscription correlation ID, notification correlation ID, notification target address, notification event ID, etc.) on interactions (AF request or AF transaction) between the source EES 100 and the 3GPP network.

At step 704 (step 4), the target EES 200 may select the target EAS based on the target DNAI value and the source EAS-related information provided from the source EES 100, and transmit the target EAS information (ID and address information, etc.) to the source EES 100.

At step 705 (step 5), the source EES 100 may provide the target EAS information, provided from the target EES 200, to the source EAS 101 (step 705a) and the UE 50 (step 705b). The operation performed at step 705 may include one of the following operations.

First, the edge enabler client 52 in the UE 50 may store the received target EAS information, break the binding between the existing application client and the source EAS information, and bind and store the application client and new target EAS information. Information on the source EAS 101 may be deleted from the cache of the EEC 52 (thereafter, an EAS discovery request message or a DNS query for the corresponding application client is processed based on the target EAS information).

Second, the source EAS 101 may redirect application data traffic to the target EAS based on the target EAS information provided from the source EES 100. The application context stored in the source EAS 101 may be transmitted to the target EAS (e.g., the EAS 201 in FIG. 1). If the application context is not stored in the source EAS 101, the target EAS may perform an operation to receive the application context from a node that stores the corresponding context.

Third, in case where the source EES 100 cannot provide the target EAS information to the UE 50 (e.g., in case where the UE 50 moves to a region inaccessible to the source EES 100 or a region inaccessible to the source edge data network (EDN) containing the source EES 100), the target EES 200 may transmit the target EAS information to the UE 50. In another example, the source EAS 101 that has received the target EAS information from the source EES 100 may notify such information to the UE 50 (the source EAS 101 may transmit the target EAS information to the application client, which may provide that information to the edge enabler client).

Figure 8:
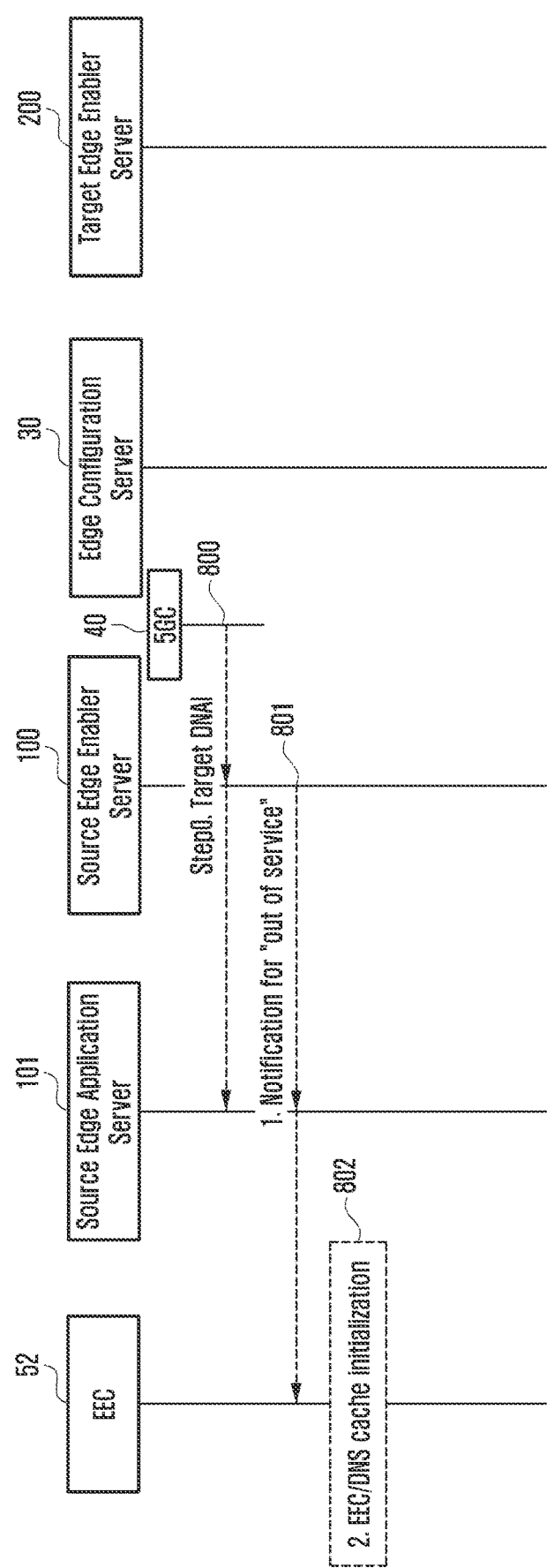
FIG. 8 is a diagram illustrating a signal flow for an operation of DNAI-based target EAS discovery of EES according to an embodiment of the disclosure.

FIG. 8 is a diagram illustrating a signal flow for an operation of DNAI-based target EAS discovery of EES according to an embodiment of the disclosure.

The operation of FIG. 8 may be a simplified procedure corresponding to a procedure of performing the above-described operation of step 703*a* (step 3*a*) in FIG. 7. Therefore, step 800 (step 0) may be the same operation as the above-described operation of FIG. 7.

In response to the operation of step 800, the source EES 100 may determine that the target DNAI provided from the 3GPP network 40 is a DNAI that cannot provide the edge computing service by itself. In this case, the source EES 100 may immediately transmit at step 801 (step 1) a notification message indicating the edge computing service unavailability to the EEC 52 of the UE 50. Therefore, the EEC 52 of the UE 52 may recognize that it needs to access the central server. That is, through the step 801, the source EES 100 may induce the EEC 52 of the UE 50 to access the central server.

If the UE 50 moves to an area in which communication with the source EES 100 is impossible, the source EES 100 may notify this fact to the edge configuration server 30. In this case, the ECS 30 may induce access to the central server by transferring a notification message indicating the edge computing service unavailability to the UE 50. In another method, the edge configuration server 30 may subscribe to the 3GPP network 40 in advance to receive a notification message when an event that the UE 50 moves to an unserviceable area occurs. In this case, upon receiving such a notification message from the 3GPP network 40, the ECS 30 may notify this the EEC 52 of the UE 50. Accordingly, step 802 (step 2) can be induced. In still another example, the ECS 30 may precede a subscribe operation to the 3GPP network 40 to receive a notification message for the UP path change message of the UE 50. As such, in case of first performing the subscribe operation to receive the notification message for UP path change message, the ECS 30 may determine (identify) whether the edge computing service is available, based on target DNAI information in the UP path change notification message.

Then, according to the disclosure, a method for the source EES 100 or the edge configuration server 30 to determine that the edge computing service cannot be provided to the UE 50 will be described.

First, a specific node of the 3GPP network 40, for example, the SMF or NEF may inform in advance the source EES 100 or the edge configuration server 30 about a target DNAI value that cannot provide the edge computing service. For example, the operator may recognize in advance available/unavailable DNAI values to provide the edge computing service, based on a contract with the edge computing service provider and network configuration information acquired in advance. Accordingly, the operator can preconfigure a DNAI set composed of the available/unavailable DNAI values for providing the edge computing service. The preconfigured DNAI set may be defined for each application service and mapped to at least one value among EAS ID, EAS type, application ID, and AC type, which are supported by the DNAI set. In another method, the DNAI set capable of using a service provided by a specific edge computing service provider may be predefined for each edge computing service provider (ECSP). Accordingly, the predefined DNAI set may be mapped to the ECSP ID. In still another method, the DNAI set may be predefined for all the edge computing services. The DNAI set defined in this method may be locally configured in the edge configuration server (ECS) 30 or each EES, or may be stored in SMF, PCF, UDM, UDR, etc. of the 3GPP network. For example, the SMF may determine (identify) the availability of the edge computing service, based on the DNAI value newly determined according to the movement of the UE and the service information (EAS ID, application ID, EAS type, etc.) being provided to the UE.

Second, the DNAI value of edge computing service unavailability may be locally configured in the source EES 100 or the edge configuration server 30 (e.g., in case of being determined and configured by the network operator), or information obtained by previously performing the target EAS discovery operation for other UE may be stored.

In case of receiving the corresponding notification message, the UE 50 may perform initializing/deleting the corresponding EAS information (related information such as EAS address and EAS type) and lifetime stored in the EEC cache and DNS cache and perform a DNS query operation.

The source EES 100 may transmit the above notification message to the source EAS 101 as well, and the source EAS 101 receiving the notification message may perform an operation of transmitting the application context to the central server.

Figure 9:
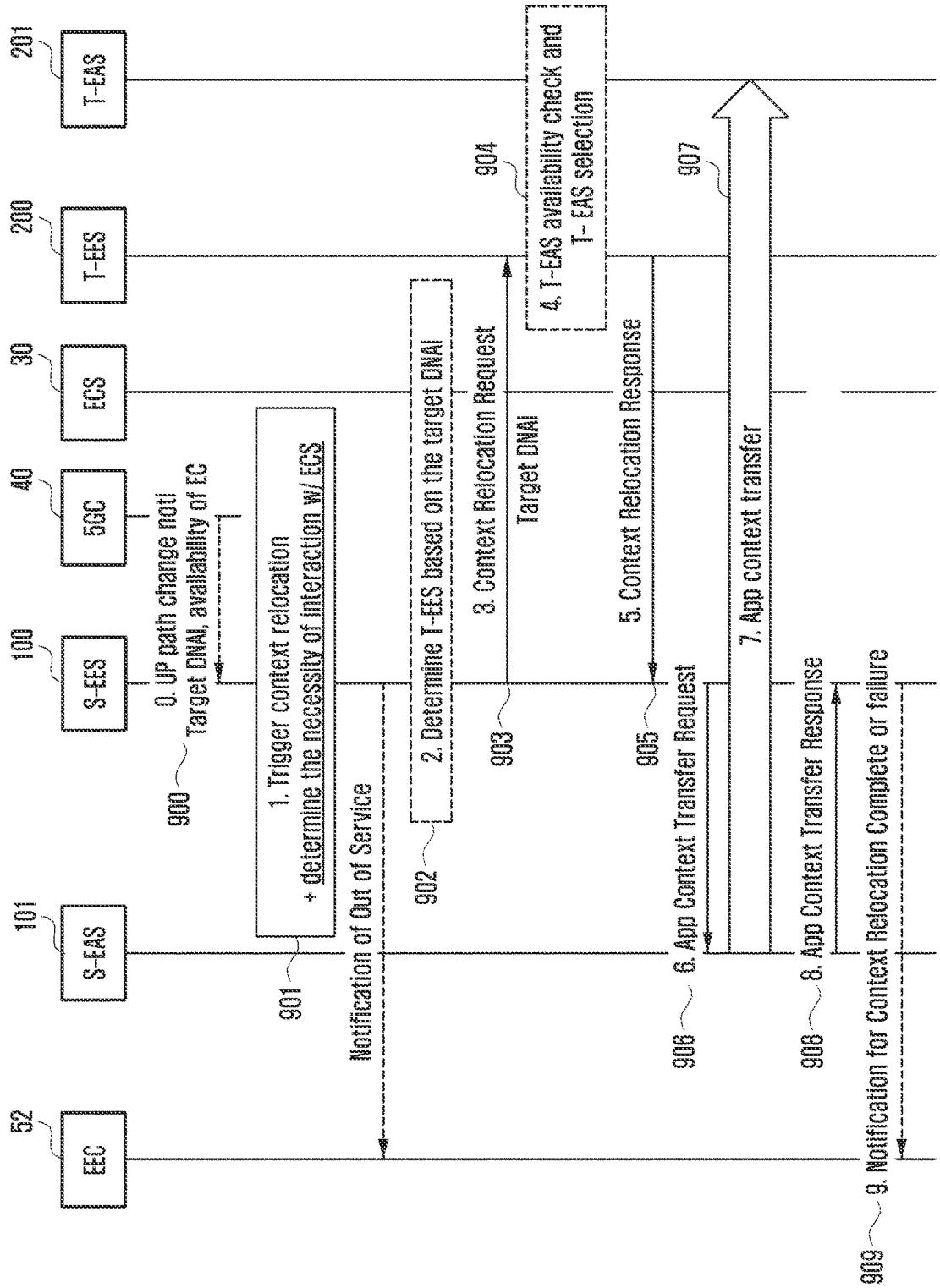
FIG. 9 is a diagram illustrating a signal flow for a DNAI-based application context relocation procedure according to an embodiment of the disclosure.

FIG. 9 is a diagram illustrating a signal flow for a DNAI-based application context relocation procedure according to an embodiment of the disclosure.

In FIG. 9, an application context relocation procedure when selecting the target DNAI-based target EES and target EAS described above will be described. In describing FIG. 9, it is assumed that the EAS 101 and the EES 100 of FIG. 1 are source nodes, and the EAS 201 and the EES 200 of FIG. 1 are target nodes. In addition, it is assumed that the 3GPP network 300 is implemented with the 5GC 40.

At step 900, the source EES 100 may receive a UP path change notification message from the 3GPP network 40. Here, the UP path change notification message may include, as described above in the embodiments of FIGS. 7 and 8, may include the target DNAI and the availability/unavailability of edge computing service through the target DNAI.

At step 901 (step 1), the source EES 100 may determine whether to interact with the edge configuration server 30, based on information included in the UP path change notification message received at the step 900. When interactions with the ECS 30 is determined, the source EES 100 may transmit a target DNAI to the ECS 30 at step 902 (step 2). In addition, the ECS 30 may determine a target EES that can be accessed through the target DNAI provided at the step 902, and provide corresponding information, that is, the determined target EES information, to the source EES 100.

After performing the step 902, the source EES 100 may transmit, at step 903 (step 3), a context relocation request message including the target DNAI and the source EAS information to the target EES 200 through target EES address information provided from the ECS 30.

The target EES 200 receiving the context relocation request message at the step 903 may select the target EAS 201, based on information (target DNAI and source EAS information) in the message received from the source EES 100. In addition, at step 904 or in succession to the step 904, the target EES 200 may perform an additional operation of driving the target EAS 201 if necessary. After the availability of the target EAS 201 is checked, the target EES 200 may transmit a context relocation response message (including target EAS information) to the source EES 100 at step 905 (step 5). At step 905, the source EES 100 may transmit an application context transfer request message to the source EAS 101 in response to receiving the context relocation response message. Then, at step 907 (step 7), the source EAS 101 may transfer the application (app) context in response to receiving the application context transfer request message.

At step 908 after performing the step 907, the source EAS 101 may transfer, to the source EES 100, the fact that the application context transfer is completed. Accordingly, the S-EES 100 receiving from the S-EAS the fact that the context transfer has been completed may be configured to send an AF acknowledgment message in previous interactions with the 3GPP network 40. This may be a case that in FIG. 4 described above an indication of EES acknowledgment is included when the source EAS 100 transfers information necessary for the AF request message for the UP path management event notification to the S-EES 100. In another example, there may be a case that the S-EES 100 transmits an indication for the AF acknowledgment to be expected to the 3GPP network 40 in order to ensure stable mobility by itself.

At step 909 (step 9), the S-EES 100 transmits an AF acknowledgment message to the network function (e.g., NEF, SMF, etc.) that has transmitted the UP path change related notification message at the above-described step 900, thereby informing that UP path configuration/activation can be performed with the EEC 52 of the UE.

In case where location information of the UE is provided to the EES 100 or 200 or the ECS 30 from the 3GPP network 40 in addition to the notification message for the UP path change event described above in FIGS. 7 to 9, it is possible to compare the location information of the UE 50 with the EES service area or EAS service area information, and select an EES or EAS accessible from the location of the UE 50. In this case, if the EES service area or the EAS service area is not defined, the location of the UE 50 and the UPF service area may be compared to identify DNAI information accessible through the UPF to which the UE 50 is connectable. By comparing the identified DNAI with the EES DNAI or EAS DNAI, it is possible to select the EES or EAS accessible by the UE 50.

While the disclosure has been particularly shown and described with reference to some embodiments thereof, it will be understood by those skilled in the art that any change and modification may be made therein without departing from the scope of the disclosure. Accordingly, the scope of the disclosure should not be limited to the described embodiments and should be defined by claims set forth below and also their equivalents.

Figure 10:
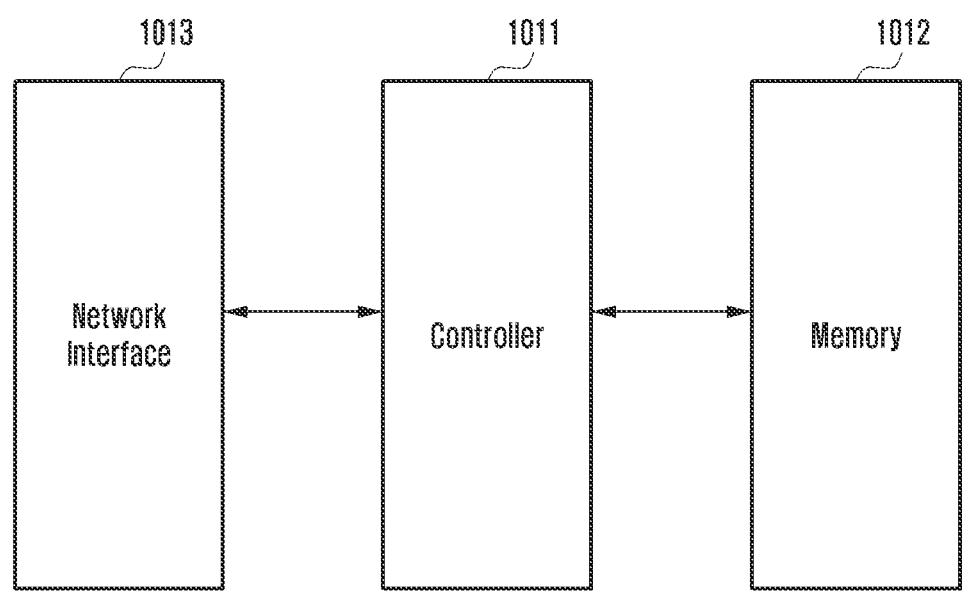
FIG. 10 is a diagram illustrating internal function blocks of an edge application server or an edge enabler server according to various embodiments of the disclosure.

FIG. 10 is a diagram illustrating internal function blocks of an edge application server, an edge enabler server, or an edge configuration server 30 according to various embodiments of the disclosure.

Referring to FIG. 10, it may be any one of the EASs 101, 102, and 201, the EESs 100 and 200, or the ECS 30 described in the disclosure. Referring to FIG. 10, a network interface 1013 may transmit/receive a signal or a message within the edge data network or with the 3GPP network 300 or 40.

A controller 1011 may perform the above-described operations. For example, when the configuration of FIG. 10 is the EAS, not only an operation for providing an edge application service, but also control according to transmission and reception of a signal described in the disclosure and operations corresponding to case of receiving a corresponding signal/message may be performed. In another example, when the configuration of FIG. 10 is the EES, not only operations for UPF relocation according to the movement of the UE, but also various controls described above and controls for transmission/reception of signals/messages may be performed. In still another example, when the configuration of FIG. 10 is the ECS, the controller 1011 may receive a discovery request of EAS and/or EES from a specific node in the edge computing system and/or a specific node of the 3GPP network and perform controls for corresponding retrieval and provision of information. In addition, when the configuration of FIG. 10 is the ECS, controls according to the above-described embodiments of FIGS. 3 to 9 may be performed.

A memory 1012 may store a program and various kinds of control information required by the controller 1011, and may also store various kinds of information described in the disclosure.

The EAS, the EES, or the ECS may further include various interfaces for connection with an operator in addition to the configuration described above. In the disclosure, there is no particular limitation on such an additional configuration.

INDUSTRIAL APPLICABILITY

The disclosure can be used in case of providing an MEC service.

The invention claimed is:

1. A method by an edge enabler server (EES) of a mobile edge computing (MEC) system for interacting with a mobile communication network to provide an edge computing service to a user equipment (UE), the method comprising:
   subscribing to a user plane (UP) path change event at an edge application server (EAS);
   determining an application context relocation (ACR) based on receiving a UP path management event notification from the mobile communication network in case of subscribing to the user plane path change event for the EAS;
   transmitting, to the EAS, an ACR request message;
   receiving, from the EAS, an EAS response message; and
   in response to receiving the EAS response message from the EAS, transmitting an application function (AF) acknowledgment message to a first node of the mobile communication network,
   wherein the EAS response message corresponds to a case that an indication of EAS acknowledgment is received from the EAS when subscribing to the UP path change event.

2. The method of claim 1,
   wherein subscribing to the user plane path change event includes:
      receiving, from the EAS, a subscribe request message requesting a UP path change event management for the UE,
      in response to the subscribe request message, checking occurrence of the user plane path management event for the UE with the first node of the mobile communication network, and
      transmitting a subscribe response message to the EAS, and
   wherein the subscribe request message for the UE is a message for application context relocation.

3. The method of claim 2, wherein the subscribe request message is a message requesting a notification of UP path change detection according to mobility of the UE to which the EAS provides edge computing service traffic.

4. The method of claim 3,
wherein the subscribe request message includes a subscription type and the indication of EAS acknowledgment, and
wherein the subscription type includes an indication of at least one of an early notification and a late notification.

5. The method of claim 4,
wherein the checking occurrence of the user plane path management event for the UE further includes:
transmitting a subscribe request message for the UP path management event notification to the first node of the mobile communication network, and
wherein the subscribe request message for the UP path management event notification includes an indication of "an application function (AF) acknowledgment to be expected".

6. The method of claim 1, wherein the first node of the mobile communication network is a session management function (SMF) device.

7. The method of claim 1, further comprising:
receiving, from the EAS, an EAS profile when the EAS is registered,
wherein the EAS profile includes information indicating that the EAS supports application context transmission.

8. A method by an edge application server (EAS) of a mobile edge computing (MEC) system for interacting with a mobile communication network to provide an edge computing service to a user equipment (UE), the method comprising:
subscribing to a user plane (UP) path change event with an edge enabler server (EES) connected to the EAS;
transmitting, to the EES, an application context relocation (ACR) request message; and
receiving, from the EES, an EAS response message,
wherein the EAS response message corresponds to a case that an indication of EAS acknowledgment is transmitted to the EES when subscribing to the UP path change event.

9. The method of claim 8,
wherein the subscribing to the user plane path change event includes:
transmitting, to the EES, a subscribe request message requesting a UP path change event management for the UE, and
receiving, from the EES, a subscribe response message, and
wherein the subscribe request message for the UE is a message for application context relocation.

10. The method of claim 9, wherein the subscribe request message is a message requesting a notification of UP path change detection according to mobility of the UE to which the EAS provides edge computing service traffic.

11. The method of claim 9,
wherein the subscribe request message includes a subscription type and the indication of EAS acknowledgment, and
wherein the subscription type includes an indication of at least one of an early notification and a late notification.

12. The method of claim 9, further comprising:
transmitting, to the EES, an EAS profile when the EAS is registered,
wherein the EAS profile includes information indicating that the EAS supports application context transmission.

13. An edge enabler server (EES) apparatus for providing an edge computing service to a user equipment (UE) in a mobile edge computing system, the apparatus comprising:

a network interface is configured to communicate with an edge computing system or a mobile communication system;
a memory configured to store information; and
at least one processor, wherein the at least one processor is configured to:
subscribe to a user plane (UP) path change event of an edge application server (EAS) through the network interface,
determine an application context relocation (ACR) based on receiving a UP path management event notification from the mobile communication network through the network interface in case of subscribing to the user plane path change event for the EAS,
transmit, to the EAS, an ACR request message through the network interface,
receive, from the EAS, an EAS response message through the network interface, and
transmit an application function (AF) acknowledgment message to a first node of the mobile communication network through the network interface in response to receiving the EAS response message from the EAS,
wherein the EAS response message corresponds to a case that an indication of EAS acknowledgment is received from the EAS when subscribing to the UP path change event.

14. The apparatus of claim 13,
wherein the at least one processor is configured to, when subscribing to the user plane path change event:
receive, from the EAS, a subscribe request message requesting a UP path change event management for the UE,
in response to the subscribe request message, check occurrence of the user plane path management event for the UE with the first node of the mobile communication network, and
transmit a subscribe response message to the EAS,
wherein the subscribe request message for the UE is a message for application context relocation.

15. The apparatus of claim 14, wherein the subscribe request message is a message requesting a notification of UP path change detection according to mobility of the UE to which the EAS provides edge computing service traffic.

16. The apparatus of claim 14,
wherein the subscribe request message includes a subscription type and the indication of EAS acknowledgment, and
wherein the subscription type includes an indication of at least one of an early notification and a late notification.

17. The apparatus of claim 14,
wherein the at least one processor is configured to, when checking occurrence of the user plane path management event for the UE, transmit a subscribe request message for the UP path management event notification to the first node of the mobile communication network through the network interface, and
wherein the subscribe request message for the UP path management event notification includes an indication of "an application function (AF) acknowledgment to be expected".

18. The apparatus of claim 13, wherein the first node of the mobile communication network is a session management function (SMF) device.

19. The apparatus of claim 13,
  wherein the at least one processor is configured to receive, from the EAS, an EAS profile through the network interface when the EAS is registered, and
  wherein the EAS profile includes information indicating that the EAS supports application context transmission.

20. An edge application server (EAS) apparatus for providing an edge computing service to a user equipment (UE) in a mobile edge computing system, the apparatus comprising:
  a network interface is configured to communicate with an edge computing system or a mobile communication system;
  a memory configured to store information; and
  at least one processor, wherein the at least one processor is configured to:
    subscribe to a user plane (IP) path change event with an edge enabler server (EES) connected to the EAS through the network interface,
    transmit, to the EES, an application context relocation (ACR) request message through the network interface, and
    receive, from the EES, an EAS response message through the network interface,
  wherein the EAS response message corresponds to a case that an indication of EAS acknowledgment is transmitted to the EES when subscribing to the UP path change event.

21. The apparatus of claim 20,
  wherein the at least one processor is configured to, when subscribing to the user plane path change event:
    transmit, to the EES through the network interface, a subscribe request message requesting a UP path change event management for the UE, and
    receive, from the EES through the network interface, a subscribe response message, and
  wherein the subscribe request message for the UE is a message for application context relocation.

22. The apparatus of claim 21, wherein the subscribe request message is a message requesting a notification of UP path change detection according to mobility of the UE to which the EAS provides edge computing service traffic.

23. The apparatus of claim 21,
  wherein the subscribe request message includes a subscription type and the indication of EAS acknowledgment, and
  wherein the subscription type includes an indication of at least one of an early notification and a late notification.

24. The apparatus of claim 20,
  wherein the at least one processor is configured to transmit, to the EES through the network interface, an EAS profile when the EAS is registered, and
  wherein the EAS profile includes information indicating that the EAS supports application context transmission.

* * * * *